(12) United States Patent
Moktader et al.

(10) Patent No.: US 7,189,273 B2
(45) Date of Patent: Mar. 13, 2007

(54) INDUCING AIR

(75) Inventors: Mohammed Moktader, West Springfield, MA (US); Zahir Adil, Burlington, MA (US)

(73) Assignee: Aerosynthesis LLC, West Springfield, MA (US)

( * ) Notice: Subject to any disclaimer, the term of this patent is extended or adjusted under 35 U.S.C. 154(b) by 0 days.

(21) Appl. No.: 10/423,576

(22) Filed: Apr. 25, 2003

(65) Prior Publication Data

US 2004/0211317 A1    Oct. 28, 2004

(51) Int. Cl.
*B01D 35/00* (2006.01)
*F02B 31/00* (2006.01)

(52) U.S. Cl. .................. 55/385.3; 55/413; 55/DIG. 28; 123/306

(58) Field of Classification Search .................. 55/327, 55/413, 385.3, DIG. 28; 123/306, 305, 590, 123/585, 592
See application file for complete search history.

(56) References Cited

U.S. PATENT DOCUMENTS

| 2,461,395 | A | 2/1949 | Psikal | |
|---|---|---|---|---|
| 6,536,420 | B1 | 3/2003 | Cheng | 123/590 |
| 6,550,446 | B1 * | 4/2003 | Robley, Jr. | 123/306 |
| 6,802,890 | B2 | 10/2004 | Hyppänen | 95/271 |
| 6,837,213 | B1 | 1/2005 | Burnett | 123/306 |
| 6,841,133 | B2 | 1/2005 | Niewiedzial et al. | 422/147 |
| 2003/0150439 | A1 * | 8/2003 | Hsu | 123/592 |

OTHER PUBLICATIONS http://www.vortexdehydration.com/index_1.htm, captured on the Internet Mar. 9, 2005.
http://www.vortexdehydration.com/id28_m.htm, captured on the Internet Mar. 9, 2005.
www.turbonator.com, captured on the Internet Mar. 30, 2005.
www.spiralmax.com, captured on the Internet Mar. 30, 2005.
www.airaid.com, "Throttle Body Spacers", captured on the Internet Mar. 30, 2005.
www.tornadoair.com, captured on the Internet Mar. 30, 2005.
Patent Prior Art Keyword Search-Airfilter, pp. 1-842, Mar. 25, 2003.
International Search Report, Patent Cooperation Treaty, Sep. 5, 2006, 11 pages.

* cited by examiner

*Primary Examiner*—Robert A. Hopkins
(74) *Attorney, Agent, or Firm*—Fish & Richardson P.C.

(57) ABSTRACT

A mechanism configured to interact with air, which has been sucked through a device that imparts turbulence to the air, causes a redistribution of components (e.g., oxygen and nitrogen) in the air so that when the air arrives at a location where the oxygen is to be consumed there is an enriched supply of oxygen available. The effects of a first stage of turbulence of the induced air is reduced, resulting in a higher density supply to the atomization point and to the combustion chamber, in the case of an internal combustion engine.

**71 Claims, 29

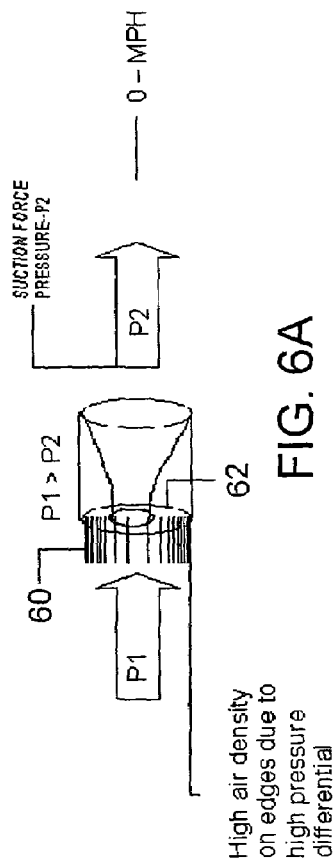
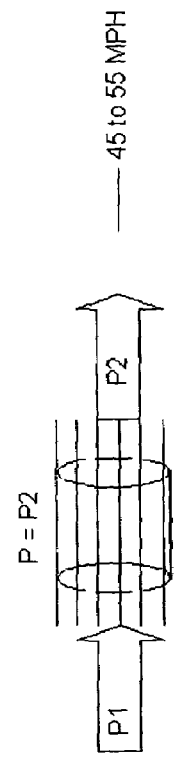
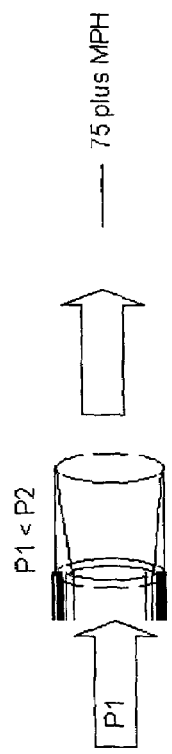
FIG. 6A
FIG. 6B
FIG. 6C
P1 - Ambient air pressure at input of the filter.
P2 - Suction force pressure at the output of the filter.
When engine power max outs, suction force become constant. If ambient air intake is direct or impinging then any increase in opposing wind velocities will increase pressure differential between P1 & P2.

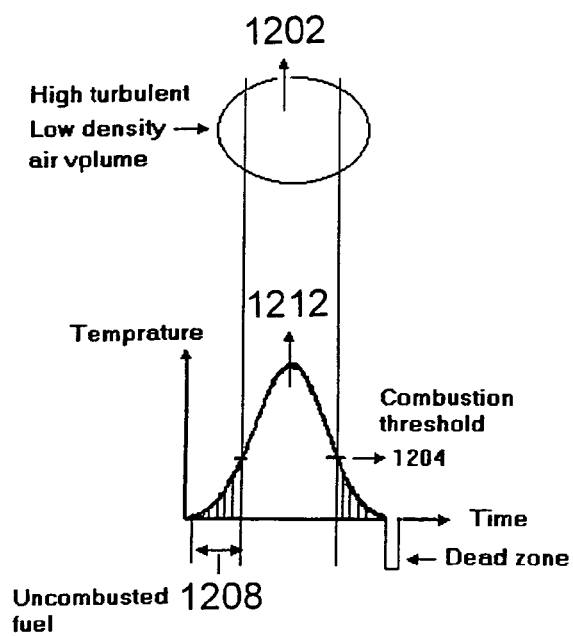
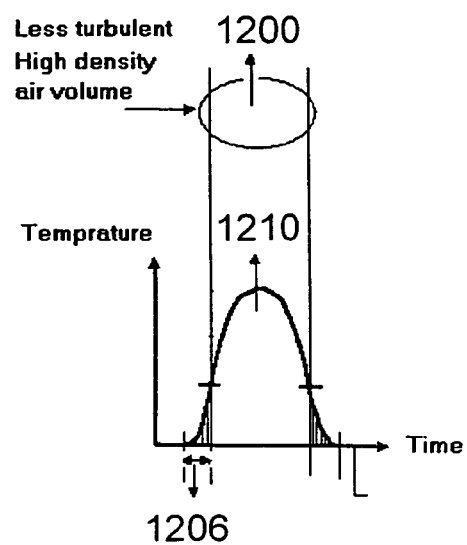
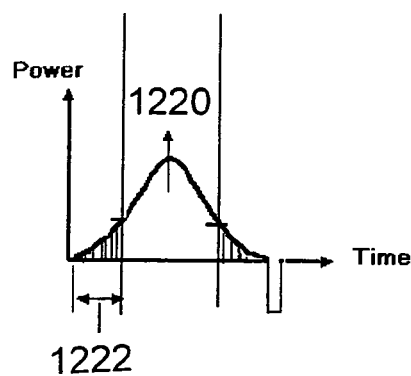
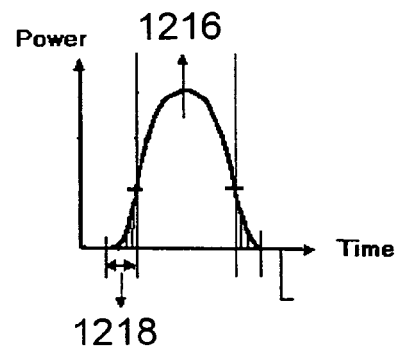
FIG. 12F                    FIG. 12G Note: Usually suction pressure is a negative quantity. For simplification purpose it's drawn as a positive value.

INDUCING AIR

BACKGROUND

This description relates to inducing air.

In an internal combustion engine, for example, induced air from the ambient is mixed with fuel prior to combustion. Good combustion can be achieved if the induced air is homogeneous and the fuel-air mixture has a particular ratio.

As shown in FIG. 1, air is induced into an engine 10 of a typical automobile along an induction pathway that includes a breathing port 12, an air filtration system 14 within a housing the expansion room 15, intake port 16, tubing 18 leading to a throttle body 20 (shown schematically), to the atomization point, 21, where fuel injectors spray fuel into the induced air which is atomized within the induced air. Tubing 22 feeds the atomized fuel-air mixture from the atomization point into the combustion chambers 24 of the cylinders 26, where it is ignited by spark plugs 28 controlled by a timing mechanism 30.

The efficiency of the engine depends on the amount of oxygen that is available from the induced air to mix with the fuel at the point of atomization. The ambient air, and thus the induced air, contains about 21% oxygen and 78% nitrogen. A typical engine is designed to use an air/fuel ratio of about 1 to 14 by weight at the point of atomization.

As shown also in FIG. 2, the ambient air is inducted by the suction of the engine vacuum acting through the air filter 14 (which removes particles from the air) and into air expansion chamber 15, and through intake port 16, and through the piping 18 and an intake manifold 17 that lies along the length of the engine next to the intake ports 19 of the cylinders. The sucking occurs in cycles as each cylinder in turn undergoes an intake stroke as the piston is drawn away from its associated intake port 19. The cycling causes the air to be induced and to arrive at the intake manifold in successive bursts 30. The separation between successive bursts is smaller the higher the revolutions per minute (RPM) of the engine as selected by the driver using the throttle pedal. The timing between successive intake strokes also depends on the RPM. During the intake stroke of a given cylinder, one of the bursts of air is located at the right position along the intake manifold to be drawn into the atomization point 21 for mixture with the fuel.

SUMMARY

In general, in one aspect, the invention features, an apparatus that includes a mechanism configured to interact with air, which has been sucked through a device that imparts turbulence to the air, to cause a redistribution of components in the air so that when the air arrives at a location where the oxygen is to be consumed there is an enriched supply of oxygen available.

Implementations of the invention may include one or more of the following features. The mechanism is configured to impart centrifugal force to the components and the components are characterized by different masses. The mechanism comprises deflection surfaces. The mechanism comprises a set of deflection surfaces arranged in a suction path along which the air is being sucked. The device comprises an air filter. The mechanism is also configured to be mounted within an air box having an air inlet served by the device that imparts turbulence. The mechanism comprises a set of vanes configured to spin the air that has been sucked through the device. Each of the vanes is arranged at an angle to a path along which the air is being sucked. The vanes are arranged around a central point to form a spinner. At least some of the vanes are mounted so that an angle formed between the vanes and a path along which the air is being sucked varies with the force of sucking. The vanes comprise airfoils. The vanes are configured to cause components of the air having higher masses to move radially away from a path along which the air is being sucked. The vanes are configured to cause components of the air having lower masses to move radially toward a path along which the air is being sucked.

The device comprises an air filter. The air filter and the mechanism to cause redistribution of the components of the air are connected in a single unit. The air filter and the mechanism are connected with a gap between them. The gap is between 1 and 10 mm. The air filter and the mechanism are connected so that a gap between them fluctuates with the degree of the sucking force. The air filter and the mechanism are connected using a flexible skirt. The air filter comprises an automotive air filter and the mechanism comprises an air spinner.

The apparatus includes an air box. The mechanism is supported within the air box. The mechanism is supported at a predetermined distance from an outlet of the air box. The air box includes an outlet. The mechanism is configured to redistribute the components so that oxygen reaches the outlet before nitrogen. The mechanism has an axis and the outlet is aligned with the axis. The mechanism has an axis and the outlet is not aligned with the axis. The air box includes exhaust openings to remove at least some components of the air other than oxygen. The exhaust openings include pressure-operated valves. The air box includes a structure configured to select air to be drawn into the air box based on the temperature of the air.

In general, in another aspect, the invention features an automotive air filter comprising a filter material supported by a frame and deflecting vanes supported by the frame.

In general, in another aspect, the invention features a method comprising, at a place downstream of a device that imparts turbulence to a flow of air that is being sucked through the device on its way to a location where oxygen in the air is to be consumed, redistributing components of the air so that when the air arrives at the location where the oxygen is to be consumed there is an enriched supply of oxygen available.

Implementations of the invention may include one or more of the following features. The redistributing of the components includes imparting centrifugal force to separate components of the air based on their relative masses. The redistributing of the components includes spinning the air that is sucked through the device. The spinning comprises deflecting the air on deflection surfaces. The components of the air are redistributed beginning at no more than a small distance from the device through which the air is being sucked. The device through which the air is being sucked comprises an air filter. The location at where the oxygen is to be consumed comprises an atomization point in an internal combustion engine. The components of the air comprise oxygen and nitrogen. The redistribution of the components comprises causing at least one of the components to tend to occupy a central cylindrical region and at least another of the components to tend to occupy a cylindrical shell around the central cylindrical region. The oxygen tends to occupy the central cylindrical region. The oxygen tends to occupy the cylindrical shell.

In general, in another aspect, the invention features a method comprising increasing availability at a downstream location in an engine of oxygen contained in a supply of air by mechanically separating oxygen and nitrogen at an upstream position in an air induction path leading from an intake filter to the downstream position.

In general, in another aspect, the invention features apparatus comprising an internal combustion engine, an induction pathway from a source of ambient air to the engine, a filter in the induction pathway, and a structure of deflecting vanes attached to the air filter to deflect air that has been sucked through the filter.

In general, in other aspects, the invention features methods of making air filters that include deflection vanes, methods of installing deflection vanes, and methods of making air boxes that include deflection vanes.

In general, in another aspect, the invention features an apparatus that includes an internal combustion engine, an induction pathway from a source of ambient air to the engine, a filter in the induction pathway, and a structure of deflecting vanes attached to the air filter to deflect air that has been sucked through the filter.

In general, in other aspects, the invention features apparatus that includes a mechanism configured to interact with air, which has been sucked through a device that imparts turbulence to the air, by (1) reducing a stage of low-amplitude, high-frequency turbulence imparted to the air as it is being sucked through the device, (2) causing a reduction in effects that are due to bands of turbulence produced in the air by stroking of an internal combustion engine, and/or (3) causing a reduction in effects that are due to phase shifts within bands of turbulence produced by in the air by stroking of an internal combustion engine.

Implementations of the invention may include one or more of the following features. The vanes are configured to cause components of the air having lower masses to move radially away from a path along which the air is being sucked. The vanes are configured to cause components of the air having higher masses to move radially toward a path along which the air is being sucked. The exhaust openings include pressure-operated valves are supplemented by a suction enhancement device. The turbulence is reduced by placing vanes in the air path for incidental losses.

In general, in another aspect, the invention features an apparatus that includes an internal combustion engine, an induction pathway from a source of ambient air to the engine, a filter in the induction pathway, a structure of deflecting vanes attached to the air filter to deflect air that has been sucked through the filter, and a mechanism to change the angle of the deflecting vanes depending on the suction force, using at least one of the suction force, a vacuum or an electrically-operated actuator.

Other advantages and features will become apparent from the following description and from the claims.

DESCRIPTION

FIG. 6 shows air permeability of a reverse nozzle at different velocities.

FIG. 12F shows combustion and power profiles for a high turbulence air supply

FIG. 12G shows combustion and power profiles for a low turbulence air supply.

Apparently, designers of the air filter 14 and the piping 18 leading to the intake manifold have assumed that the air that is sucked through the air filter and the piping will inherently maintain the same oxygen/nitrogen profile (that is, the relatively random positions of nitrogen and oxygen molecules in the ambient air) as in the original ambient state before being induced.

On that assumption, the desired amount of oxygen is expected to be available at the moment of, and at the point of atomization, so that the air/fuel mixture will produce the designed level of efficiency in operation of the engine.

Yet a close analysis of the airflow within the induction system suggests that the assumption is likely wrong, for the following reasons.

An air filter is typically made of a paper or synthetic material that has a non-uniform distribution of pores. The material is pleated to increase the surface area through which the inducted ambient air will flow. Both the non-uniform pore distribution and the pleating contribute to non-uniformity in the velocity distribution of the air across the output surface area of the filter. This non-uniformity of the velocity distribution at the output surface imparts at least two important effects to the characteristics of the induced air when it eventually reaches the point of atomization.

One effect is a high degree of turbulence in the induced air at the point of atomization. The other effect is a randomness in the density of air at the point of atomization caused by the high and low density bands of air along the length of the induction piping produced by successive suction cycles along the induction path, as explained below.

The turbulence is also increased by the pressure differences that are created between the input side and output side of the filter as the engine strokes.

The increased turbulence in the air on the output side of the air filter is attributable in part to the mode in which the pores of the filter material operate to pass air from the input side to the output side. As the engine strokes suck air through the filter material, particles in the air are trapped on the input surface of the filter in the vicinity of each of the pores, in particular around the entrance of the air channel that conducts air through the pore.

As shown in FIGS. 3A and 3B, which illustrate a single pore 40 schematically in cross-section, the collection of these particles 42 tends to cause the pore to act as a nozzle 44 operating in an opposite mode from the usual mode of a nozzle. In the normal mode of operation of a nozzle, relatively turbulent air enters through a wide entrance, flows through the contraction of the nozzle, loses some of its turbulence, and then jets out the narrower exit in a relatively laminar form with a higher velocity. For a nozzle in the reverse mode, as in FIGS. 3A and 3B, the opposite is true. The air is received at a relatively higher velocity, loses its relative laminar form, loses some of its velocity, and exits into the vacuum with a relatively higher turbulence. This turbulence, in addition with the turbulence introduced due to inter-molecular collisions at the output ends of the reverse nozzles, is referred to as the “first level turbulence” in later paragraphs. This is a high frequency, low amplitude turbulence component of the air that is sucked into the housing on the downstream side of the filter material.

This turbulent air is sucked into the housing on the downstream side of the filter material.

FIG. 4 illustrates a nozzle operated in reverse mode with air entering from its narrow cross-section end (46) and exiting from its wider cross-section end (47). Because of its gradually increasing cross section (from left to right in the figure), the nozzle increases the velocity non-uniformity in the air. The shape and dimensions of the nozzle determine the magnitudes of velocity and their non-uniformity across the output side.

Assume that air enters with a velocity V1 (45) at one point of intake cross-section 46 and enters with a velocity V1+DV1 (51) at another point of the same cross section. Assume also that the pressure is constant at all points of the cross section. At the exhaust cross section 47, the air velocities at the exit are V2 (48) and V2+DV2 (52). Applying Bernoulli’s equations for these two streamlines and neglecting the square values of DV1 and DV2, we obtain: V1*DV1=V2*DV2 or DV1=DV2*V2/V1. If the fractional velocities at the nozzle inlet and outlet are a1=DV1/V1 and a2=DV2/V2, then substituting DV1 from above yields: a1 =DV2 (V2/V1^2)=DV2 (V2/(V2/n)^2)=n^2 a2, where n=V2/V1 which is a fractional value and also equal to F1/F2, which is the contraction ratio of the nozzle measured in cross-sectional area F1 (49) and F2 (50) are the cross sectional areas of the input and output sides respectively, of the reverse nozzle. Then a2=a1/n^2. Thus the velocity variation at exhaust cross section 47 is higher, because n^2 is a fractional value, and the increase in the velocity variation at cross section 47 will be accompanied by higher turbulence (that is, a greater variation of velocities) at the exhaust cross section 47.

The contraction ratios of the nozzles formed by the pores of an air filter vary widely and the different contraction ratios appear in random order across the filter. The critical Reynolds number for a sphere as a function of the contraction ratio n as measured by Horner is shown in FIG. 5. The increasing turbulence is established by the fact that the critical Reynolds number decreases with decreasing contraction ratio.

In addition to the accumulation of particles on the input side of the filter material, which constrains the size of the pore openings, a second effect that forms nozzles is high differentials in pressure between the input (ambient) air side and the output side of the filter (where the pressure is negative). These high pressure differentials effectively turn pores into nozzles because of the formation of high air-density regions around the edges 60 of the pore entrances 62 as shown in FIG. 6A. As illustrated in FIGS. 6B and 6C, as the engine suction increases, the pressures along the sides of the pores will tend to equalize (FIG. 6B). This will be the most efficient working point for the filter pores. As the engine speed further increases, the capacity of the pores tend toward their maximum and efficiency decreases again (FIG. 6C).

As shown in FIG. 7, because of the random nature of the web of filter material in which the pores are formed, the orientations of the axes 70, 72, 74 of the nozzles vary. The cross-sectional profiles of the turbulences in the molecules as they exit a nozzle depends on the orientation of the axis of the nozzle relative to the axis 76 of the suction that is pulling the molecules through the nozzle. When the pore axis 70 is aligned with the suction axis, the variability in turbulence among the different molecules is relatively low across the outlet of the nozzle, although the directions of the flows of different molecules exiting the nozzle outlet vary widely. For a nozzle axis 72, 74 not aligned with the suction axis, the molecules are more turbulent at the outlet of the nozzle and have a distribution of velocities that varies from high to low across the outlet. The air molecules will undergo acceleration along an axis defined by the vector addition of the axis of suction and the axis of the pore, because of the pressure on the air due to the walls of the pore. Thus, there will be a high-density area closer to the suction axis and a low-density area away from it.

In the non-suction periods between the successive suctions that are associated with the strokes of the cylinders of the engine, the suction force stops and no substantial amount of new ambient air is being drawn through the filter. However, the relatively higher density bursts of air that were sucked through the filter in earlier strokes continue to move, due to momentum, along the air induction pathway, separated by relatively lower density regions. And the molecules of the higher density regions are subjected to increasing turbulence during the non-suction periods.

Figure 1:
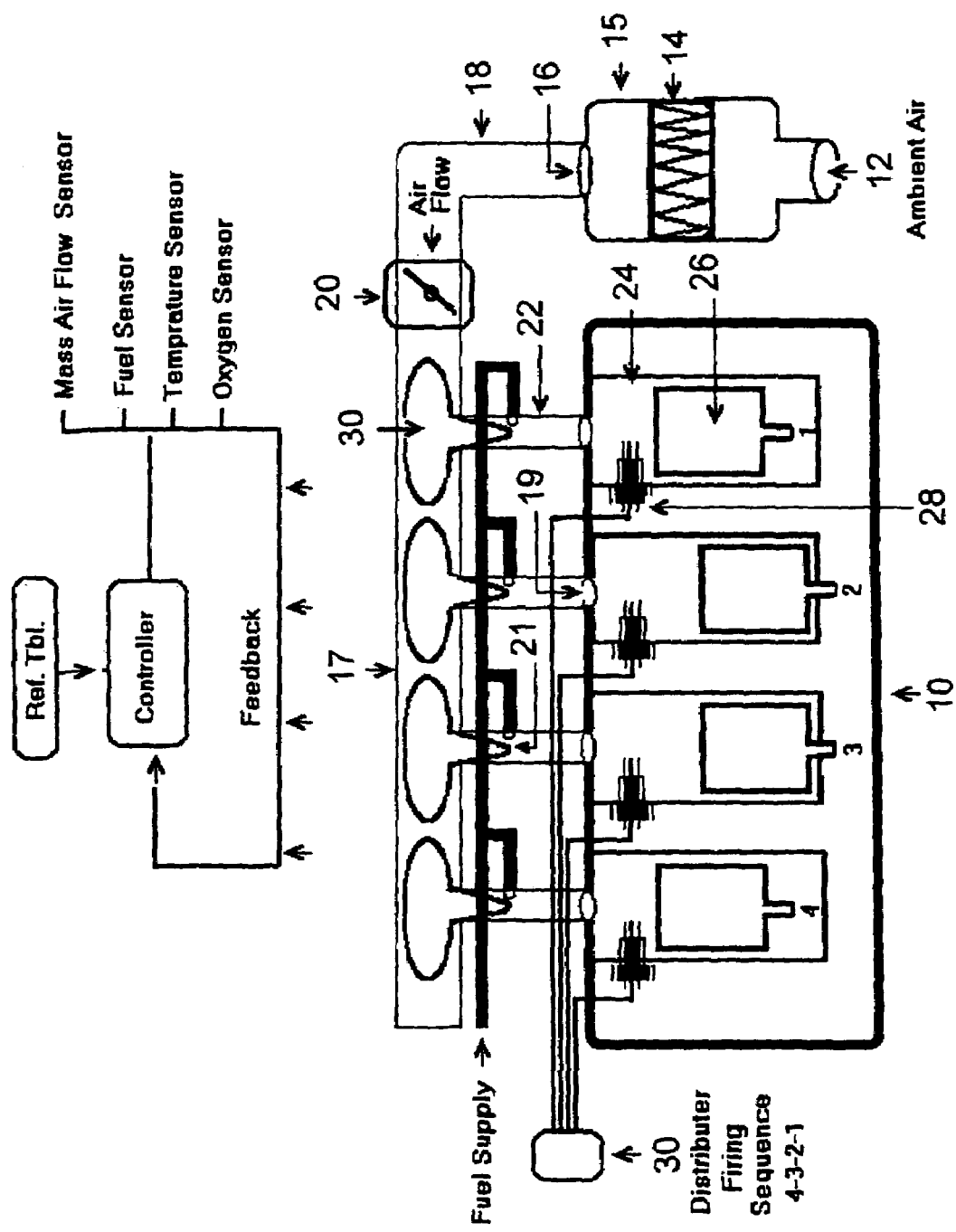
FIG. 1 shows a typical gasoline engine.
Figure 2:
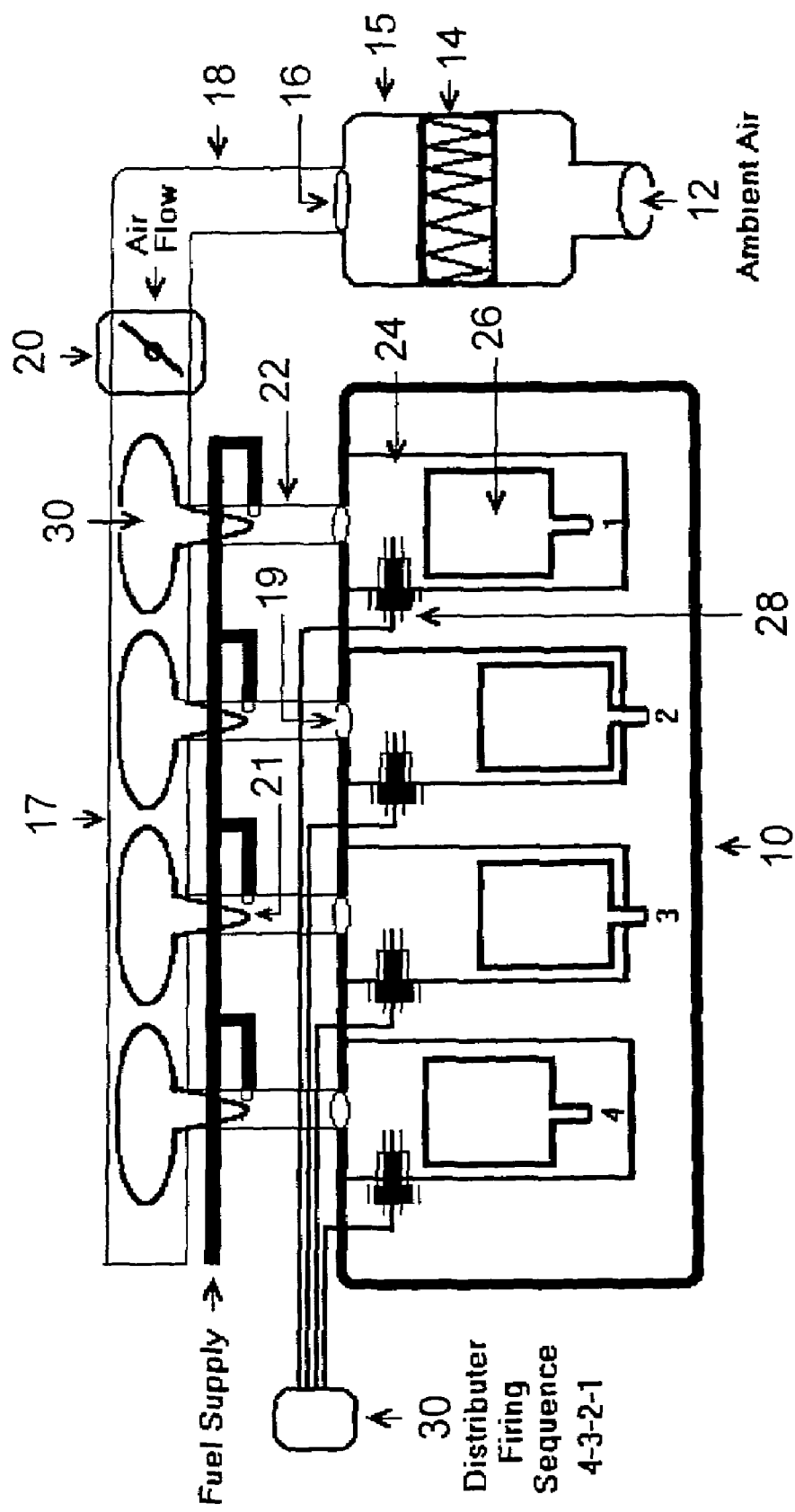
FIG. 2 shows an airflow pattern in an induction manifold.
Figure 3A:
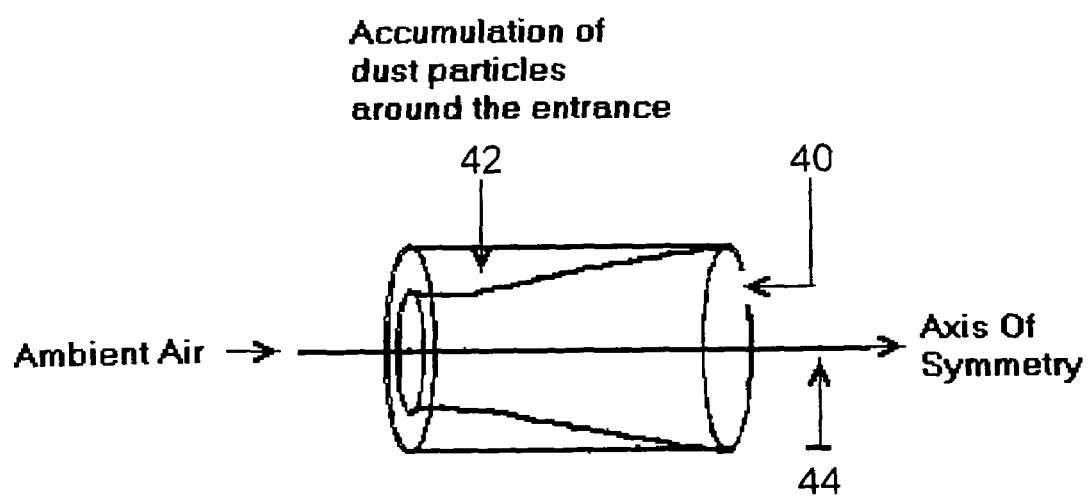
FIG. 3 shows an effect of dust on a single pore of an air filter.
Figure 3B:
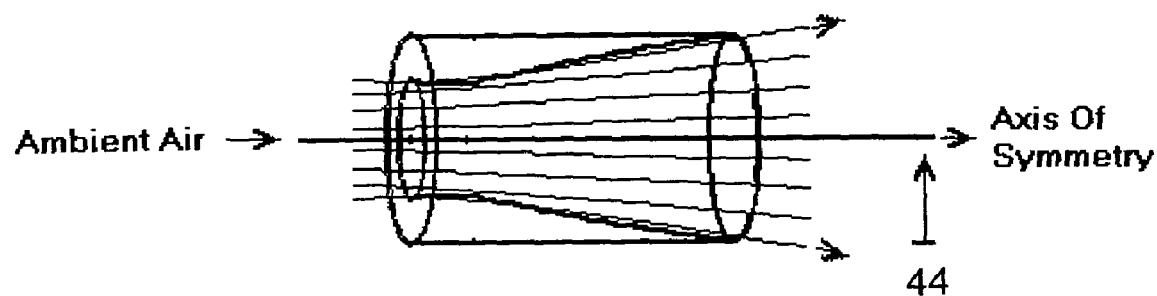
Figure 4:
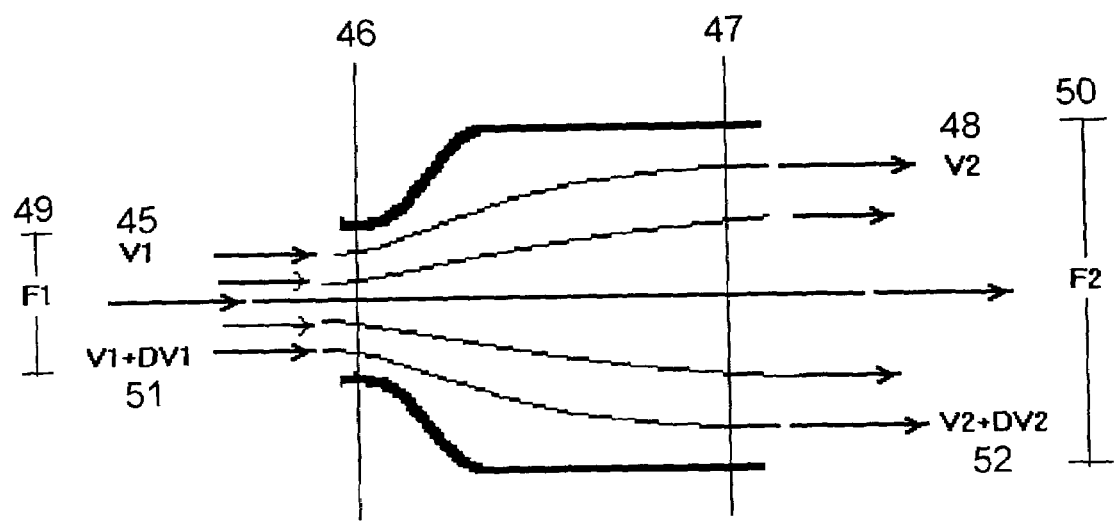
FIG. 4 shows an input and output velocity distribution along a reverse nozzle.
Figure 5:
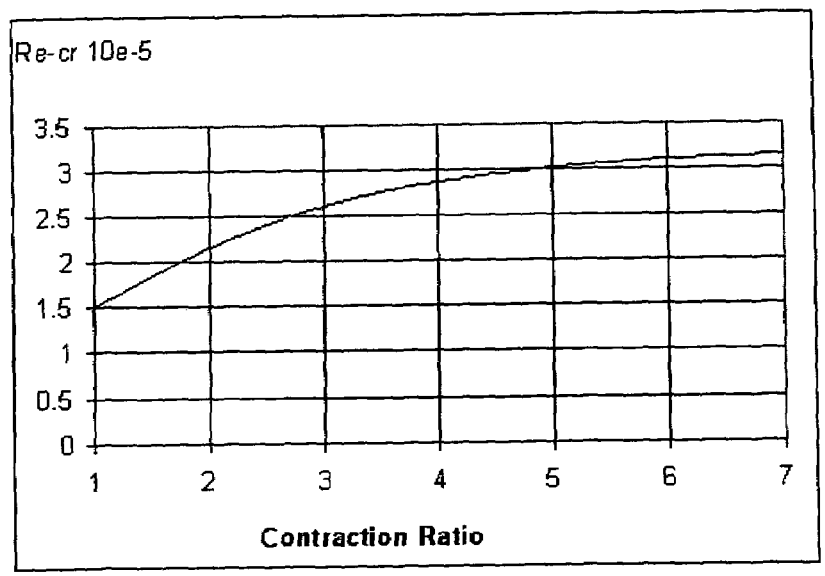
FIG. 5 shows a graph of a critical Reynolds number versus a nozzle contraction ratio
Figure 7:
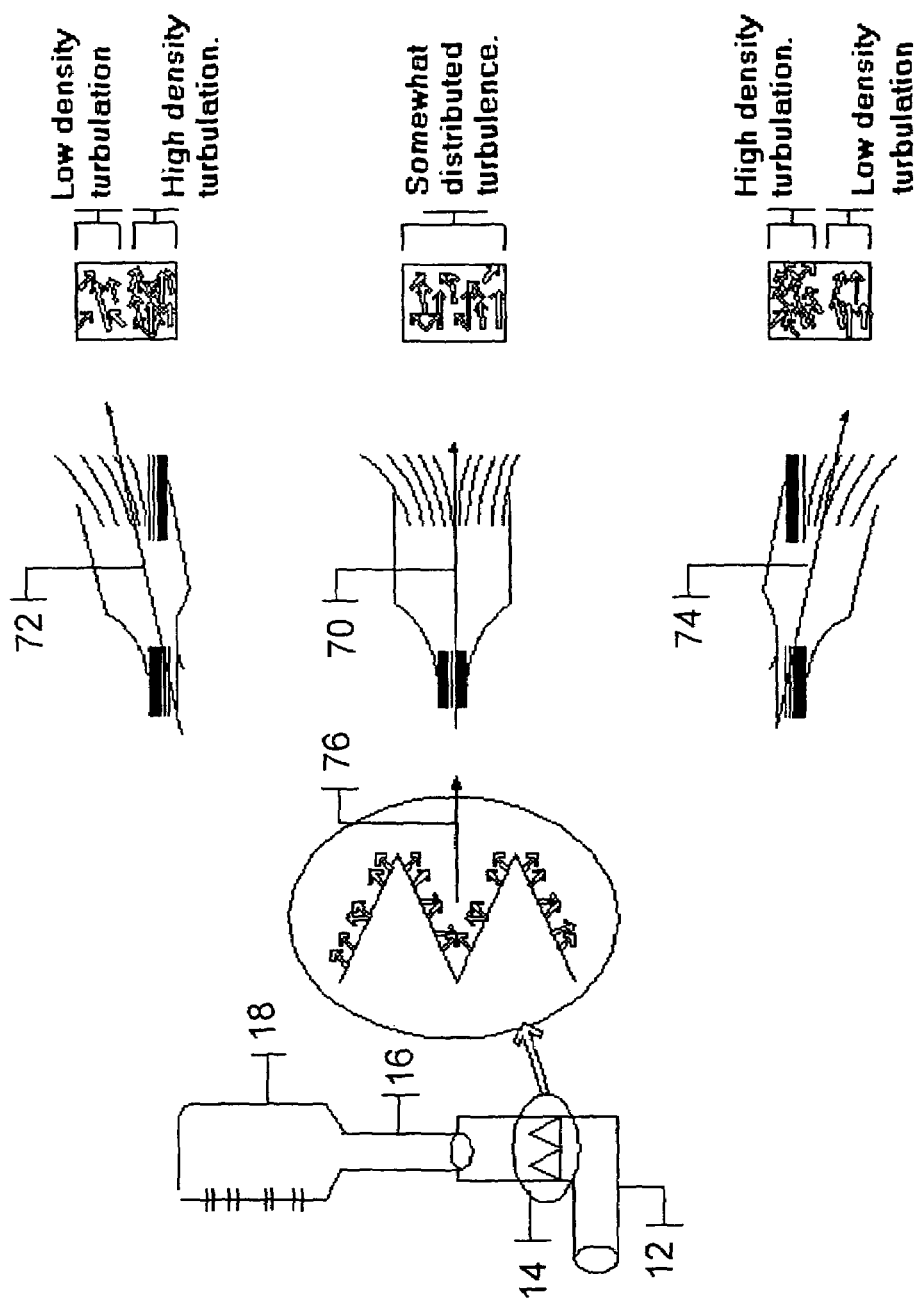
FIG. 7 shows an air density distribution across a filter due to pore non-uniformity.
Figure 8:
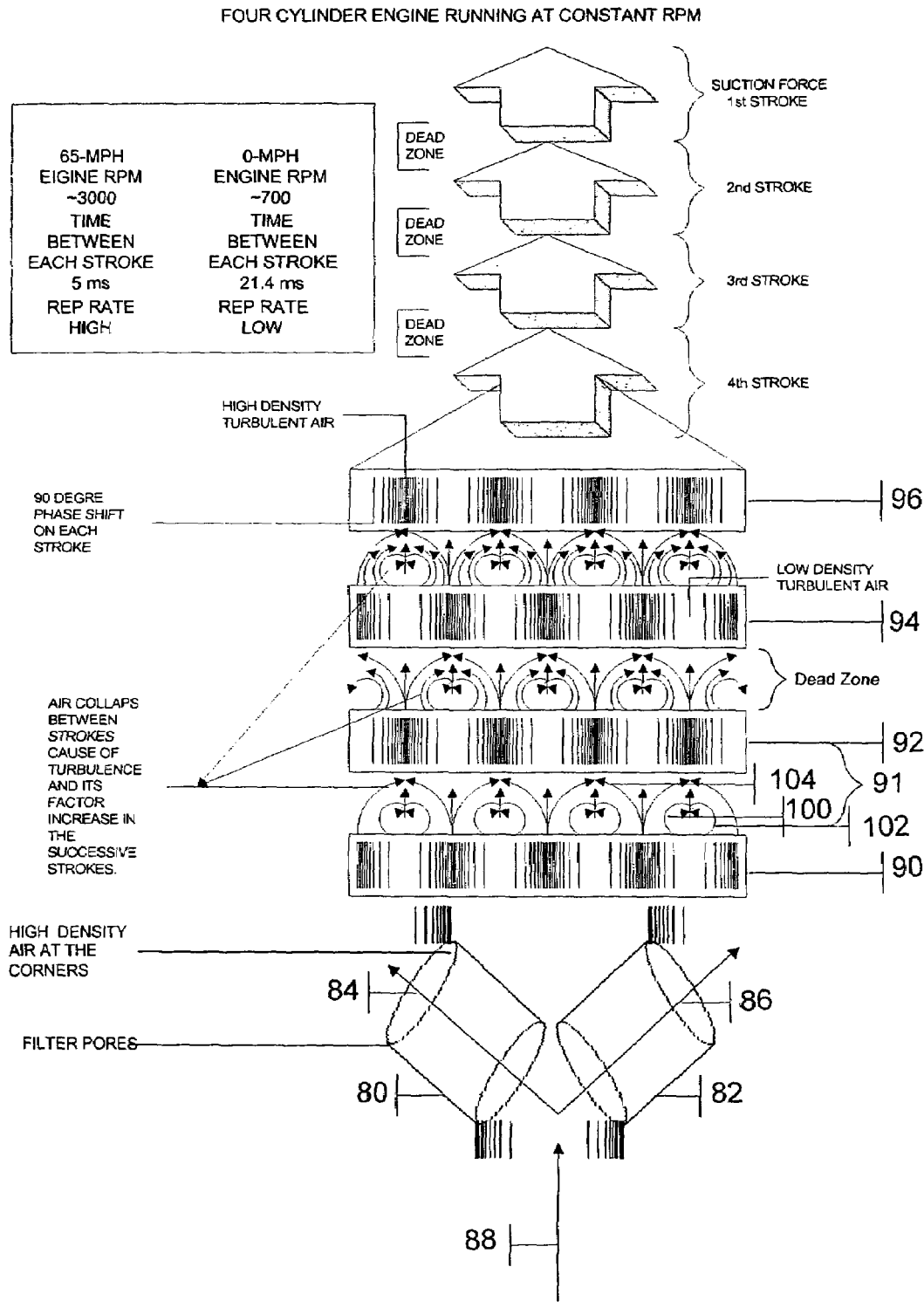
FIG. 8 shows build-up of turbulences in an engine cycle (4 induction strokes).
Figure 9:
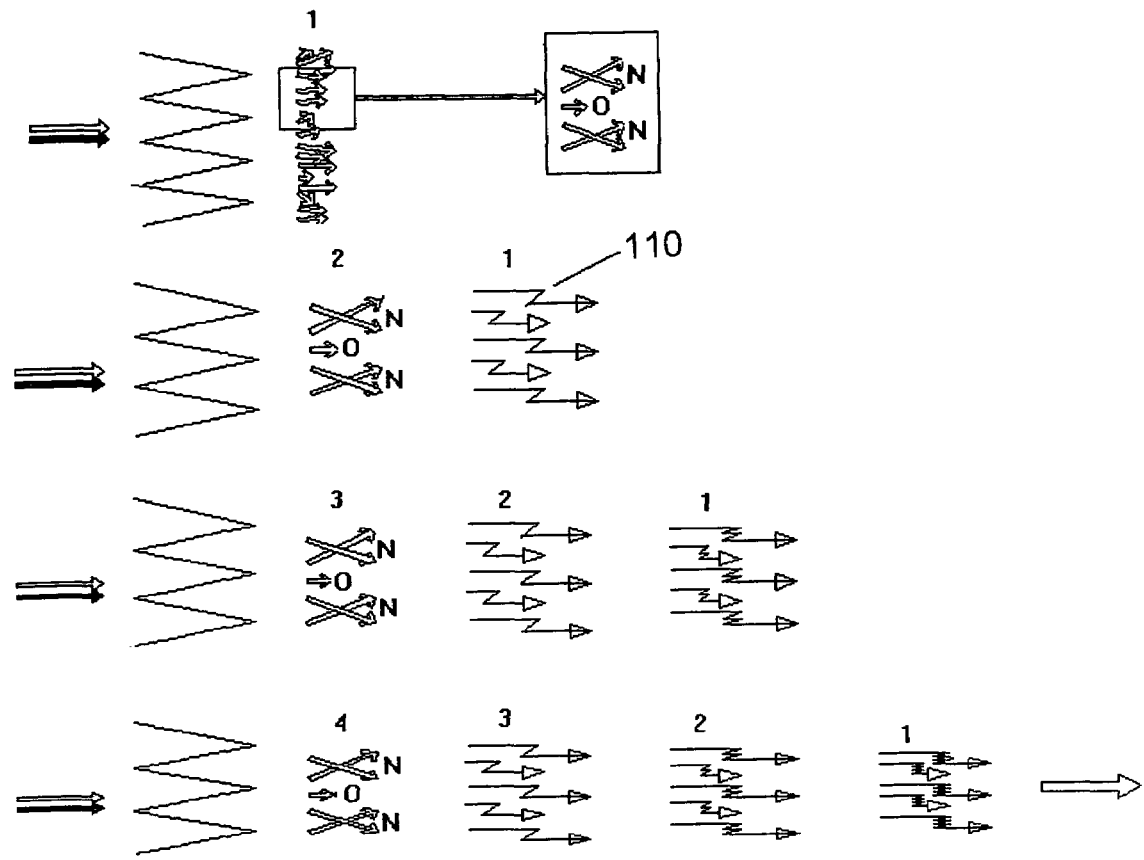
FIG. 9 shows a geometrical illustration of turbulence build-up.
Figure 10:
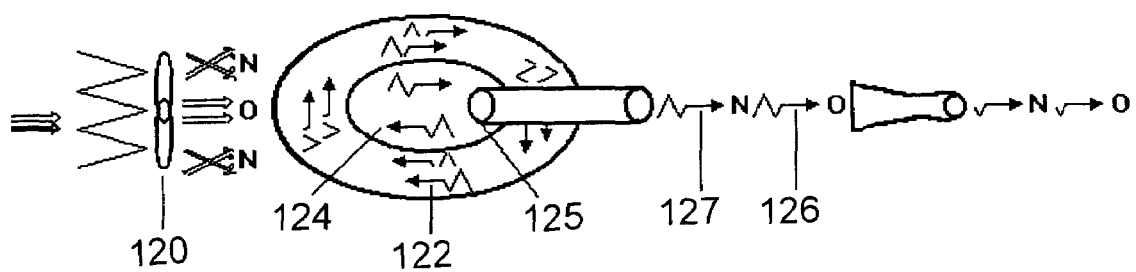
FIG. 10 shows concentration of oxygen in the center and nitrogen at the periphery (for center air intake).
Figure 11:
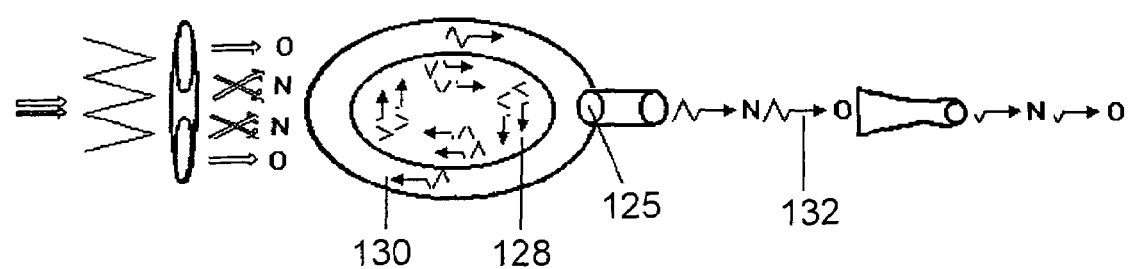
FIG. 11 shows a concentration of nitrogen in the center and oxygen at the periphery (for side air intake).

FIGS. 8 and 9 illustrate the turbulence states of successive bursts of air that are generated at the output side of the air filter and move along the air induction pathway toward the intake ports of the engine. Each burst undergoes increasing turbulence as it moves along the induction pathway.

As shown, two representative filter pores 80, 82 have axes 84, 86 that are not aligned with the suction axis 88. The velocity of the air in each pore is higher along the side that is more upstream with respect to the suction axis and the air along that side is of higher density As a result, the burst of air at position 90 has a cross-section of velocity and density areas that depend on the orientations of the pores that produced it. The figure implies that the variation of density from high to low and to high again is strictly periodic across the burst of air, but the actual profile will depend on the random orientations of the pores from which the air burst is derived.

During the non-stroke period that follows its formation, the air burst at location 90 progresses along the induction pathway to occupy an intermediate position 91. At the next suction period, it will move further and occupy the succeeding position 92. During the next suction period, the burst is pulled further along the induction pathway and acquires additional turbulence.

The additional turbulence is imparted as the higher density air regions tend to move faster and to diffuse because air flows from higher density or pressure to lower density or pressure toward each other, thus entraining the slower moving lower density air. Thus, as an air burst reaches position 92 the variations of density across the burst are approximately the converse of what they were at position 90. By the time it reaches each successive position 94, 96, the airburst has undergone additional turbulence compared to the prior position and the positions of the denser and less dense regions have undergone approximately, a 180-degree phase shift in each case. The suction forces imparted by the successive four strokes are shown schematically at the top of FIG. 8.

Although the bursts of air are shown as having strictly confined boundaries on the upstream and downstream edges, in fact, there is a more gradual transition between each of the bursts and the adjacent low-density regions.

Nitrogen molecules have a lower molecular weight than the oxygen molecules. The same suction force is being applied to both. Thus, because acceleration=force/mass, the nitrogen molecules in the air will gain higher velocity in a given time (since velocity=acceleration*time), in the turbulence than will oxygen molecules. With each successive suction cycle, nitrogen molecules undergo additional acceleration, and move faster and thus keep leading and collapsing when the suction force stops. Nitrogen, due to its lower mass, decelerates faster than oxygen, and thus can be thought of as collapsing in the path of flow around the oxygen molecules. Because the ratio of nitrogen molecules to oxygen molecules is 4:1, it is thought that the nitrogen may form a barrier just in front of the oxygen molecules.

Thus, it is believed that the pleated construction of the filter and the acceleration and deceleration of the air mass due to engine stroking continually introduces turbulences into the air and forces the nitrogen to collapse around the oxygen. As the nitrogen and oxygen encounter each dead zone, the oxygen with its higher momentum continues to move forward because it experiences a lower deceleration effect than the nitrogen. The nitrogen decelerates faster and collides with the oxygen molecules. As a result nitrogen moves over and around the oxygen, surrounding it. Nitrogen is available in greater abundance, and there are 4 molecules of nitrogen, which are available to surround the one molecule of oxygen. When the engine begins suction again, the nitrogen undergoes greater acceleration than the oxygen and again collides with the oxygen. In this stage also, the nitrogen will move over the oxygen and this will result in even more encapsulation of the oxygen molecules.

In FIG. 9, the zigzags 110 added to the arrows represent the turbulence factor added after each stroke.

As each burst of air is subjected to another sucking cycle to draw it along the induction pathway and into the intake manifold, the nitrogen molecules, which have now substantially encapsulated the oxygen molecules, undergo additional increases in turbulences due to the rib-like structure within the air box (that is, the housing for the filter) which are typically present to impart strength to the box.

In the case of an automobile that uses direct intake (in which the ambient air intake pipe opens directly to winds impinging on the front of the automobile), the ambient air creates an even higher pressure differential between the input and output sides of the filter causing it to further restrict airflow through the nozzles. Consequently, the engine uses more fuel to compensate for the power losses occasioned by the backpressure in the induction pathway, in order to maintain the velocity of the car. This phenomenon is more significant when driving against the high winds as illustrated in FIGS. 6B and 6C.

To summarize, the air filter is believed to impose turbulence on the ambient air in several ways: the turbulence imposed at the nozzle output immediately adjacent to the output side of the filter; the dynamics of the engine when stroking either in the steady state or in acceleration/deceleration mode which causes a continuous change in suction force and in the duration of the dead zones between the strokes; and the effect of the rough surface of the inner walls of the filter housing which adds further losses to the air velocities.

Each of these turbulences carries at least three different kinds of random energies: one kind similar to the white noise in radio frequencies, is due to the non-uniformity of material and construction of the filter material; a second kind due to the construction of the air box; and a third kind due to the successive stroking of the engine. The bands of air progressing along the induction path are in effect a waveform with a certain instantaneous frequency. This wave becomes the carrier for the first and second turbulences (also waveforms) just as two waves that pass each other result in a wave that is the sum of the components.

Further, it is believed that the concentration of nitrogen molecules around the oxygen molecules operates as a barrier to the mixing of the fuel with the oxygen at the atomization point and hence reduces the efficiency of combustion.

Flow control techniques downstream of the air filter can be applied that are designed not only to work against the effect of the nitrogen molecules blocking the oxygen molecules from combining with the fuel, but also to enhance the density of oxygen molecules that are available for mixing with the fuel at the atomization point. During the combustion process, this ready availability of oxygen will result in more efficient combustion than if the techniques were not applied. These techniques also decrease the pressure differential between the input side and the output side of the filter.

One key technique is to alter the induction pathway in a manner that causes the nitrogen and oxygen molecules to be separated across the broad cross-sectional profile that exists at a point near to the downstream side of the filter and then to take advantage of the separation to assure that a higher density of oxygen molecules are available to mix with fuel at the atomization point and that the nitrogen molecules are less of a barrier to that mixing.

The induction pathway can be altered in such a way that the nitrogen molecules and the oxygen molecules undergo different modes of motion because of their different molecular weights, causing them to separate spatially and enabling the mix of nitrogen and oxygen at the atomization point to be manipulated to achieve more efficient combustion.

One way to alter the pathway uses vanes (as shown in FIG. 10) (in some examples, the vanes form a so-called passive spinner 120) that spin the air around the axis of suction and thus cause the nitrogen molecules, which have a lower molecular weight, generally to form a cylindrical outer shell 122 downstream of the vanes while the oxygen molecules generally form a central column 124 within the shell. Spinning the air as it is sucked along the pathway imparts an outward force component that causes a larger outward acceleration of the nitrogen molecules than of the oxygen molecules. If the relatively small diameter port 125 that already typically exists between the filter housing and the intake manifold is positioned on the housing so that it draws air from the center column, the oxygen will be drawn to the intake manifold first 126, followed by the nitrogen 127, thus offsetting some of the effects of the nitrogen acceleration, and assuring that more oxygen is available to mix with the fuel. The profile of the air mixture entering the induction tube is believed to be somewhat spherical with oxygen molecules in higher concentration on the outer portions of the sphere and nitrogen molecules in higher concentration on the inner portions of the sphere.

In other cases, the vanes can be arranged (see FIG. 11) to direct the oxygen molecules to the outer shell 130 and the nitrogen molecules to the inner column 128 by causing an inwardly directed larger acceleration of the nitrogen molecules. Then, if the air is sucked from the shell rather than the core, the oxygen-richer portion of each burst 132 will reach the atomization point first.

Other arrangements of vanes may also be possible.

The choice of which type of vanes to use, how many to use, what configuration they should have, and how to position them, will depend, for example, on the configuration of the air box and the location from which the intake air is removed from the air box (see FIG. 12A), i.e., the location where the intake port 140 is placed in the air box. The air box 143 is often rectangular in configuration.

It is believed that as the air is sucked through the filter 142, at a high velocity, it flows out of the output side of the filter in multiple directions as described earlier. As it jets out of the filter pores, there is a crossover effect produced by the different fractional velocities of air molecules from the filter output. This effect forms a turbulent transition zone 144 just above the filter surface where the intensity of inter-molecular collisions is high. The thickness of this zone depends on the pressure differentials between the input and output of the filter pores. The spatial restriction imposed by the pleats may contribute also. Experiments indicate that the thickness of this transition zone ranges between 1 mm and 5 mm. When a spinner 135 is placed so that the air is captured just above this transition zone, the observed results are favorable.

It is desirable to capture the moving air between the transition zone and the position where the second stage of turbulence is being produced predominantly by the engine strokes. Although the first stage of turbulence in the transition zone is also created indirectly by the engine stroke, the predominant turbulence-generating factor for the first stage of turbulence is the operation of the pores as reverse nozzles as the air leaves the pores.

The first stage of turbulence, introduced by the reverse nozzle effect of filter pores, is a high-frequency, low-amplitude effect. The second and third stages of turbulences, which are due to engine strokes and the filter box housing are relatively low in frequency and high in amplitude. Those stages of turbulence are reduced at the compressions taking place at intake port 16, throttle 20, and the air output port 19 that leads into the combustion chamber, as shown in FIG. 2. By contrast, the first stage turbulent air component is carried all the way to the atomization point and into the combustion chamber. We believe, on the basis of experimentation that the first stage of turbulence is one of the factors that lowers air density, and consequently, oxygen density in the combustion chamber.

When the air is deflected from the vane surfaces, incidental losses will occur. If the surfaces are smooth enough, some of the first-stage turbulent energies will transfer into incidental losses and the air exiting the spinner will carry less of the in first-stage turbulence. Therefore placing the spinner just above the transition zone to capture the first-stage turbulence is believed to be important, so that the first-stage turbulence does not become part of the second-stage and third-stage progression of turbulences.

FIGS. 12F and 12G show anticipated combustion and power profiles as a function of time in cases of a high first-stage turbulence air supply and a low first-stage turbulence air supply, i.e., when a spinner is used. As shown, the high-turbulence air supply 1202 will result in a certain amount of combusted fuel 1212 and this combusted fuel will result in the converted power 1220. The fuel that will remain uncombusted 1208 will result in unutilized power 1222.

FIG. 12G shows the corresponding components for a low-turbulence air supply 1200, combusted fuel 1210, uncombusted fuel 1206. The power curve shows converted energy 1216 and unutilized energy 1218. We believe that the amount of fuel that will be combusted is greater in this case, as is the converted energy.

The typical distance for placement of the spinner (called the "gap spacing" below) is between about 1 mm to 5 mm, depending on the filter and air box designs. The gap spacing is measured between the bottom edges of the spinner vanes and the top edges of the pleats of the filter. Favorable gap spacings can be determined experimentally.

If the spinner is placed in the transition zone, the spinner is relatively ineffective. Experiments showed that putting the spinner too close to the filter reduced gasoline mileage. We have found that it is desirable to place the spinner far enough away from the upper edges of the filter pleats so that the air that is striking the spinner vanes is in a state just before the second stage of turbulence.

Factors that seem to affect the choice of a good gap spacing include the filter material pore density and the number of pleats in the filter, which vary from manufacturer to manufacturer, and the amount of clearance between the filter and the intake port within the air box. For air boxes in which the clearance is high, the gap spacing may be within the range of 1 mm to 5 mm. Air boxes with higher clearances allow more expansion room for the incoming air and need a larger gap spacing.

An alternative mounting can be designed to take the dynamic variation of thickness of the turbulent zone into account (as shown in FIGS. 12C and 12D). The changing suction pressure of the engine causes changes in the exit velocities of molecules from the filter pores. These molecules build up a small variable pressure outline over the filter surface just before going into the turbulence zone, and the height of the turbulence zone changes according to the change in suction force.

Figure 12A:
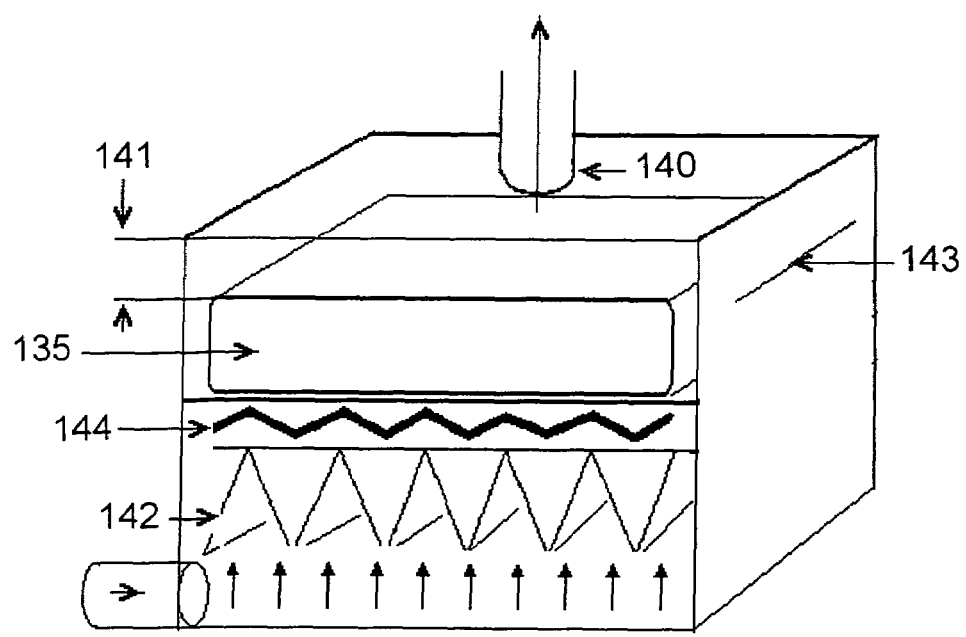
FIG. 12A shows a spinner placement.
Figure 12B:
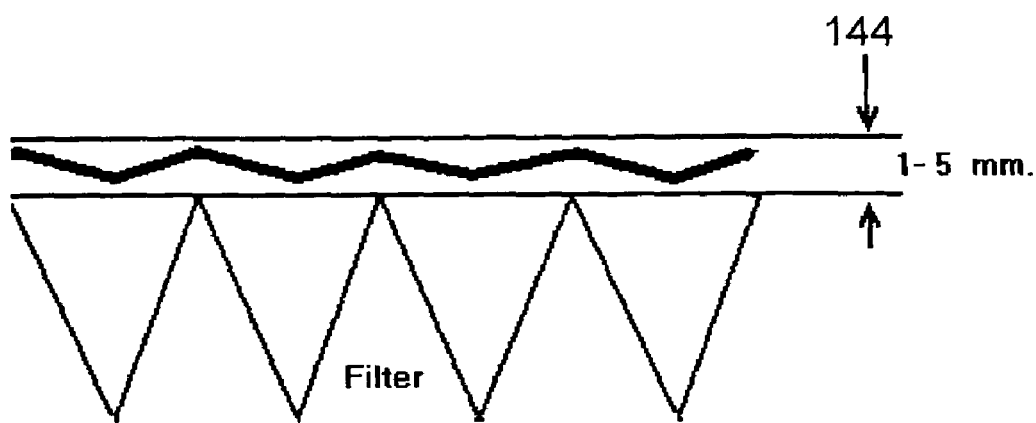
FIG. 12B shows a high molecular collision and crossover zone.
Figure 12C:
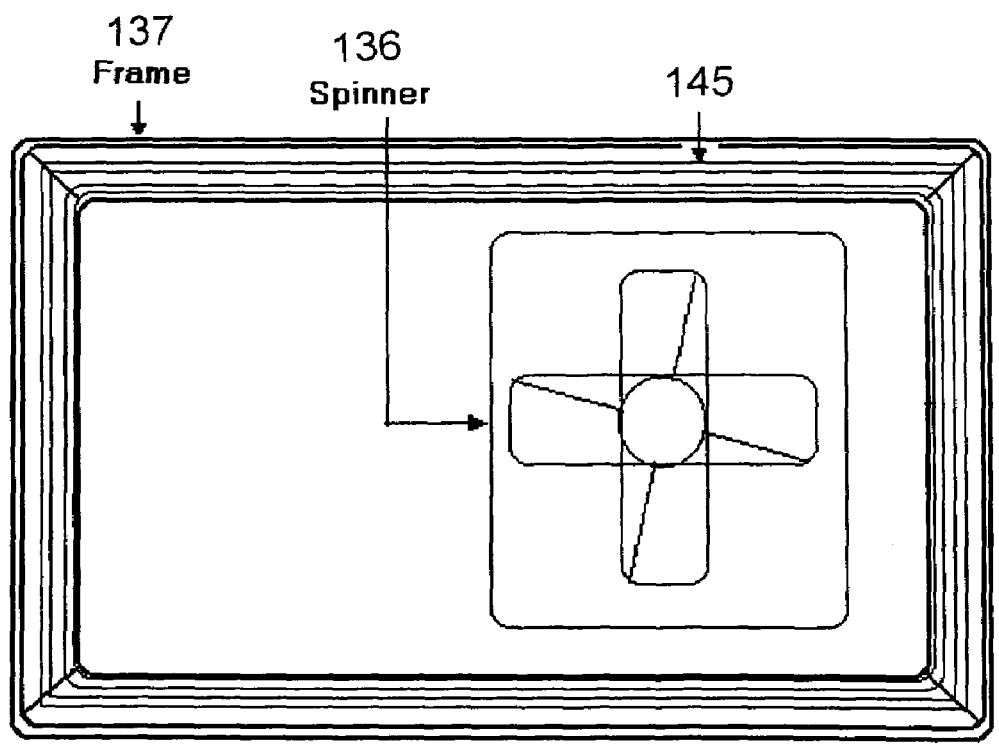
FIG. 12C shows a top view of self-adjusting spinner height.
Figure 12D:
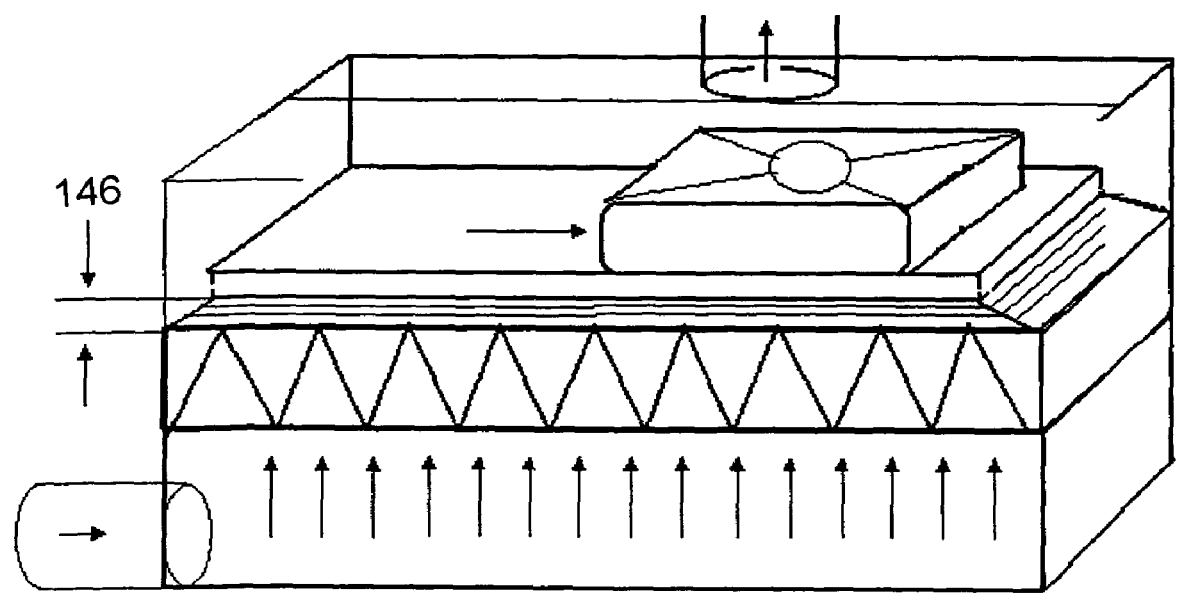
FIG. 12D shows a side view of self-adjusting spinner height.

If the spinner is mounted on a flexible skirt material 145 attached to a frame 137, which will re-adjust the height 146 (see FIG. 12D) of the spinner above the filter surface in proportion to the thickness of the turbulence zone, the efficient range of operation of the spinner will be further enhanced. In some examples, the flexible skirt will permit the gap spacing to fluctuate between approximately 1 mm and 5 mm in response to pressure change, which has been found to improve the mileage.

Figure 12E:
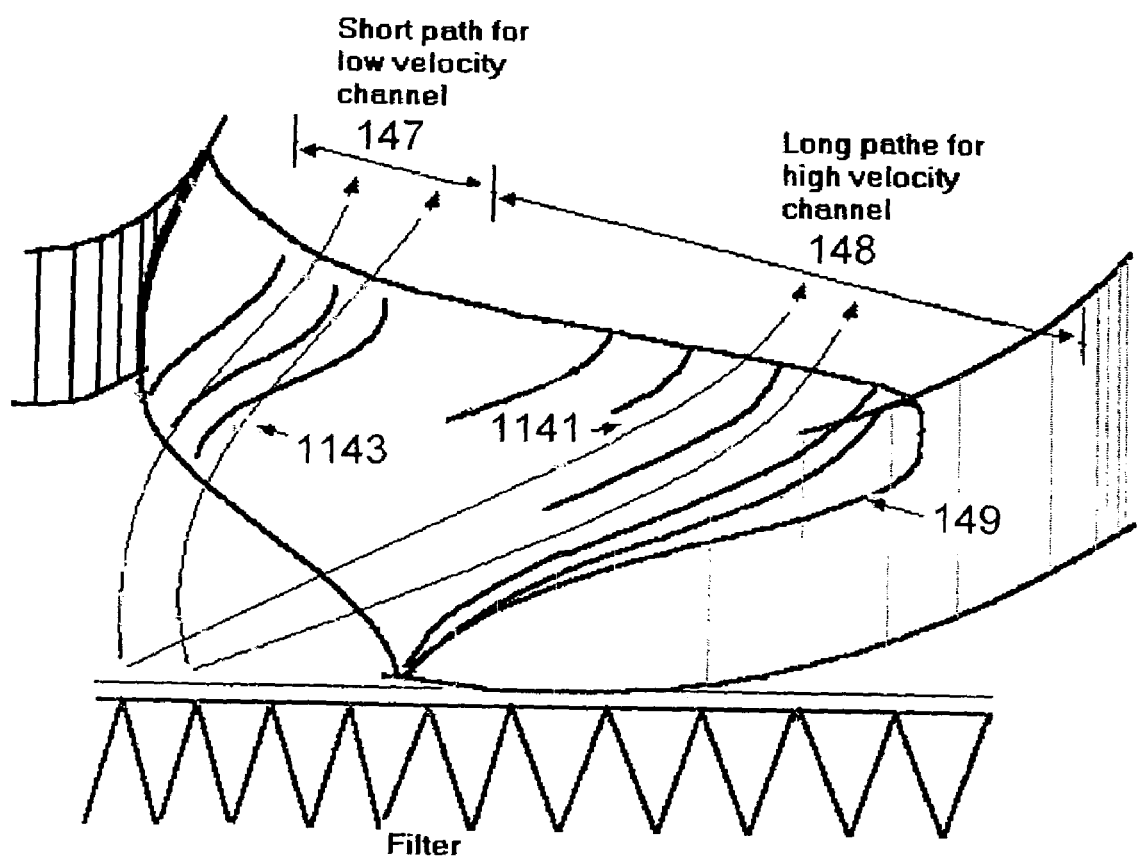
FIG. 12E shows airflow channels.

FIG. 12E shows a typical vane 149 (or fin) used in the spinner. The diagrammed vane is designed to create a velocity component of larger magnitude 1141 along the outside, and a velocity component of lower magnitude 1143 along the inside of the vane. Thus, in terms of fluid permeability, the permeability of the diagrammed vane is higher along the peripheral area 148 and lower toward the center 147. Because of the difference in molecular weights, the nitrogen molecules will thus be deflected toward the outside of the vane and will form a zone of higher nitrogen concentration 148. The oxygen molecules will gather around the area of the lower velocity component and will form a zone of higher oxygen concentration 147. As has been described earlier, a vane that creates the opposite effect can also be used. In such case, the oxygen abundant area will be on the outside and the nitrogen abundant area will be on the inside of the vane. The location of the port inside the air box determines which design is to be used.

Figure 12H:
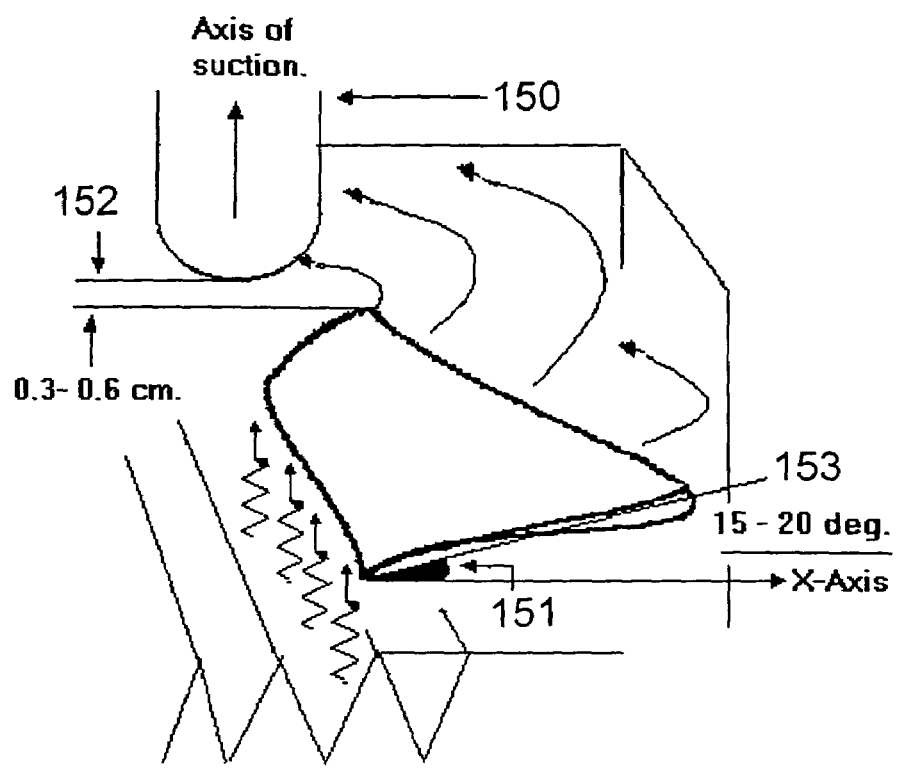
FIG. 12H shows an air intake port with 1 to 2 cm clearance.
Figure 12I:
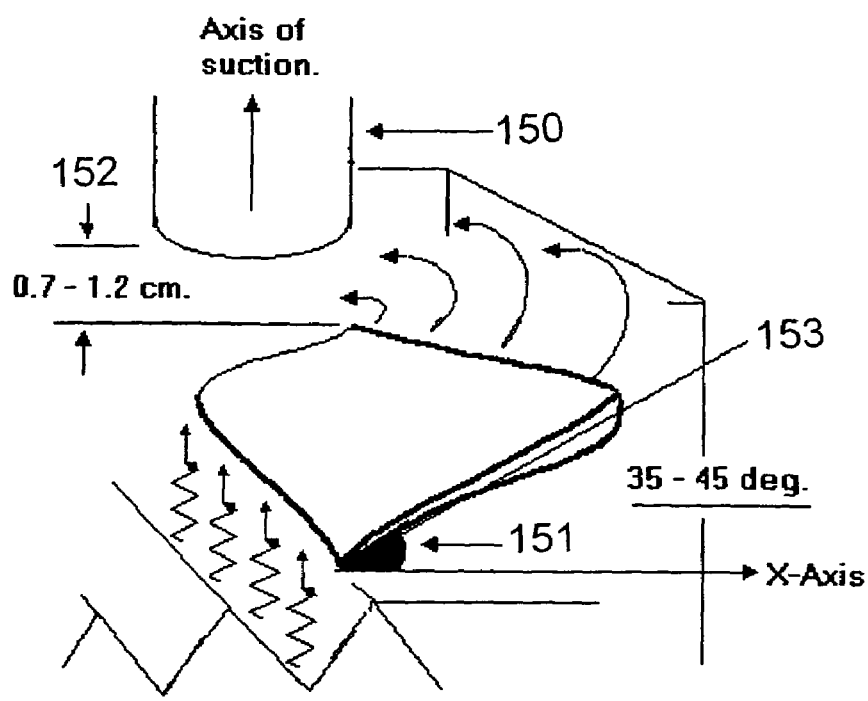
FIG. 12I shows an air intake port with 2 to 5 cm clearance.
Figure 12J:
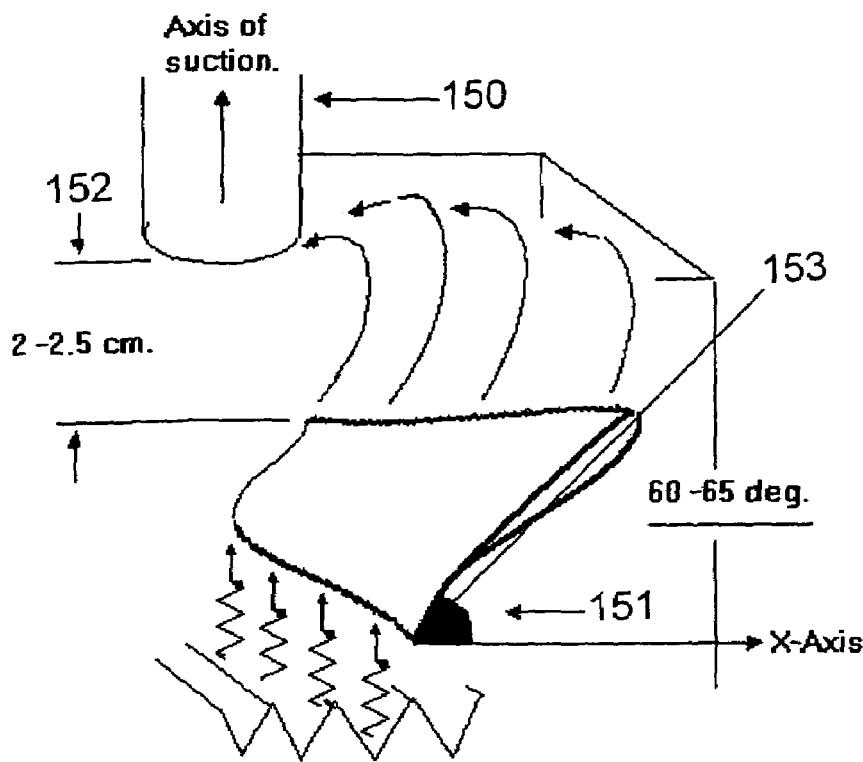
FIG. 12J shows an air intake port with more than 5 cm clearance.

FIGS. 12H, 12I and 12J show the variation of angle of inclination of the vanes of a spinner for different air boxes. The angle of inclination of the vanes are dependent upon the clearance between the top of the spinner and the air intake port within the air box. For air boxes with lower clearance, a smaller angle results in better efficiency. For air boxes with larger clearances, the angle of inclination has to be increased.

In the FIGS. 12H, 12I and 12J, the x-axis is perpendicular to the axis of suction, which is indicated as the negative y-axis. The angle of inclination 151 indicates the angle between the plane of the surface of the spinner vane 145. The vane itself is not planar; rather, it is a three-dimensional airfoil with a curvature that can be considered to be formed along a median plane 153. The angle of inclination is the measured angle between this median plane of the vane and the x-axis. There are many possible configurations and designs to set the pathways for separation of the oxygen and the nitrogen. In some examples, the airfoils have a simple shape. In other examples, they are similar to blades of a commercial fan in testing our hypothesis. While both have shown positive results, we believe that neither of them may be the most efficient design for separation.

If an airfoil were designed specifically for the purpose of separation taking the airflow characteristics in an automobile air box into account, higher efficiency may result.

The angle of inclination for either an outward spinner or an inward spinner is chosen as a function of the clearance 152 between the air intake port inside the air box and the inside filter surface.

Figure 13A:
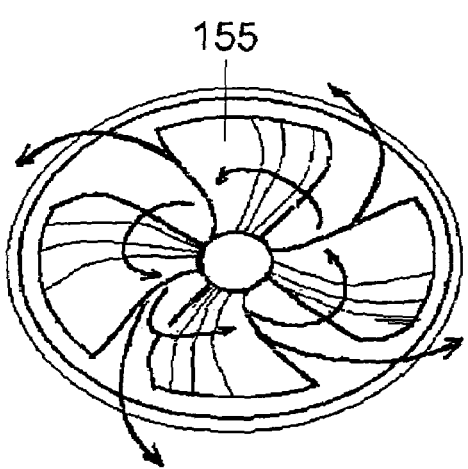
FIG. 13A shows a vane arrangement for concentrating oxygen in the center.
Figure 13B:
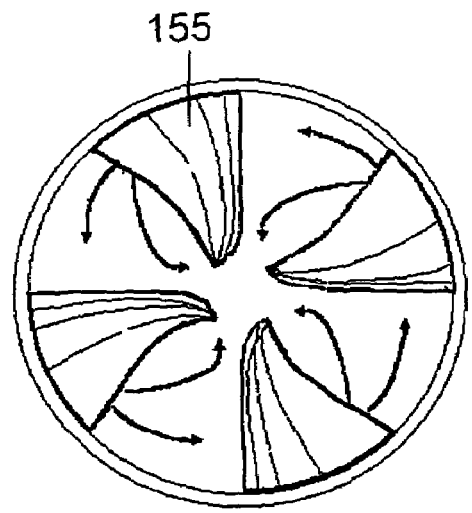
FIG. 13B shows a vane arrangement for concentrating oxygen in the periphery.

Referring to FIGS. 12H, 12I, and 12J, different incident vane angles of different spinners will create different airflow patterns. Thus, the profiles of the oxygen and nitrogen zones at the level at which the air intake port is placed in the air box will vary. It is useful to choose a spinner with a vane angle that produces an optimal separation of oxygen and nitrogen at the location of the air intake port. By doing so, higher efficiency will be achieved. Typical angles for good efficiency are between 35 and 45 degrees from the horizontal surface of the filter. FIG. 13A and FIG. 13B show spinners having four vanes 155 each. For each spinner, each of the vanes has a planar surface that is at the selected angle of inclination chosen to be suitable for the air box for which it is designed. FIG. 13A shows a spinner that creates a central oxygen-rich area while FIG. 13B shows a spinner, which creates an oxygen-rich peripheral area. These diagrams are for illustration purposes only.

Other implementations of spinners may contain other numbers of fins 155, and the shape, size, and placement of the fins may vary depending upon the shape, size and air expansion clearance of the air box of the vehicle. The air expansion clearance can be defined as the vertical clearance between the top surface of the filter and the air intake port within the air box. The shape, and size of the fins should be designed so that the most efficient separation of oxygen is achieved for the volume of the air box. Placement of the spinner will depend upon the location of the air intake port within the air box, as will the selection of the type of spinner to use.

The proper placement of the spinner unit has to be achieved in order that a good (ideally, optimal) supply of the oxygen-rich air is available at the position of the air intake port already built into the air box cover. This placement has to be chosen along all three axes, the x and the z-axes along the horizontal surface of the filter, i.e., the filter's length and width, as well as along the y-axis, i.e., the height above the filter surface where the spinner is placed. When all three of these parameters are correctly adjusted depending on the air box being targeted, an optimal oxygen-rich area can be generated at the air intake port.

As the engine suction occurs, the air being sucked will be from a certain fairly well defined region within the air box. This region of suction, called the "suction range", changes in volume as engine suction changes. Specifically, the suction range will become narrower relative to the suction axis as the force increases, and therefore the volume enclosed by the boundaries of the suction range will decrease with increasing suction force. For efficient utilization of the spinner unit, it is important to design and to place the unit so that the oxygen-rich channel falls within the dynamics of the suction range of the air intake port.

Figure 13C:
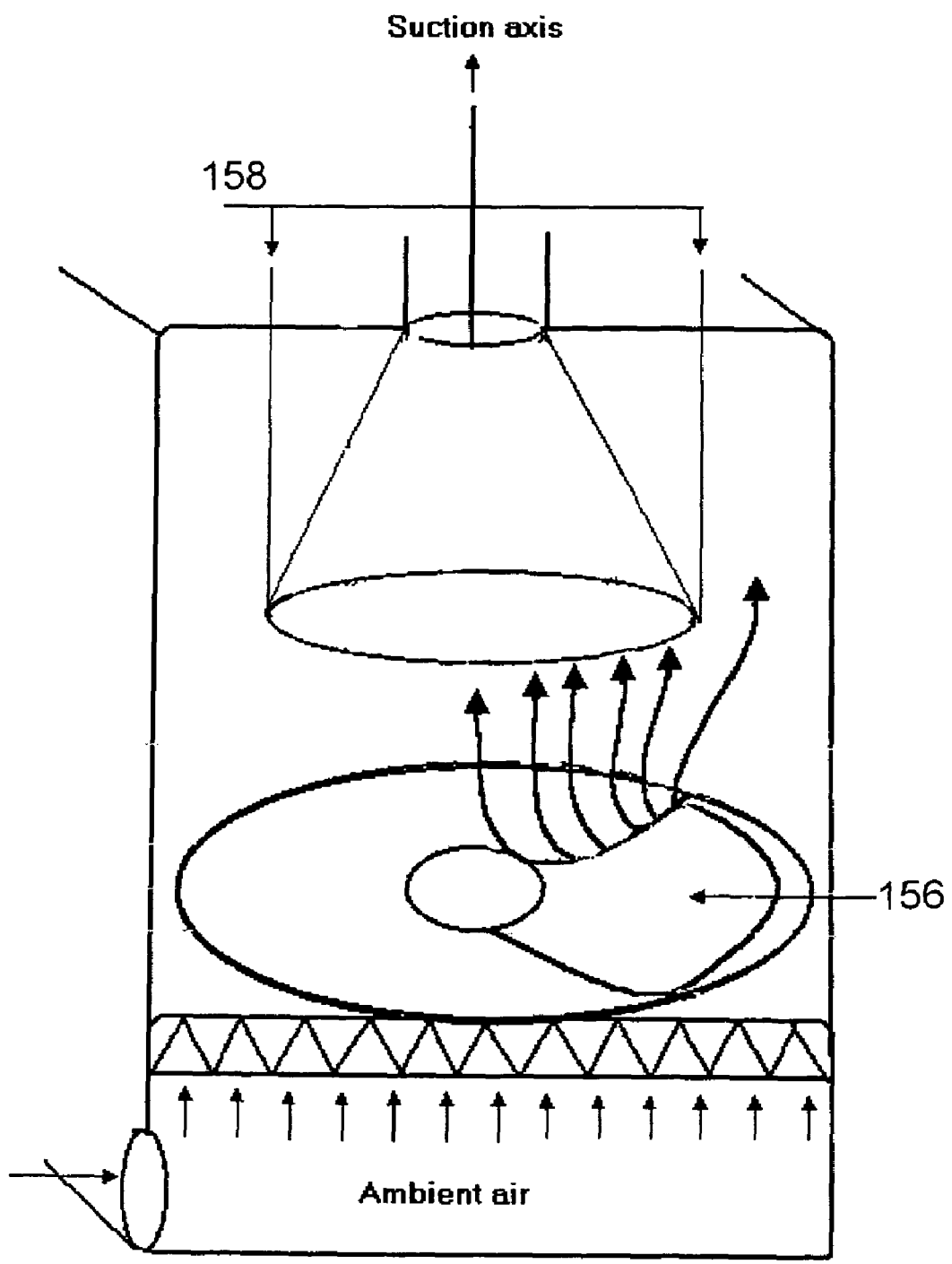
FIG. 13C shows a suction force range at low RPM.
Figure 13D:
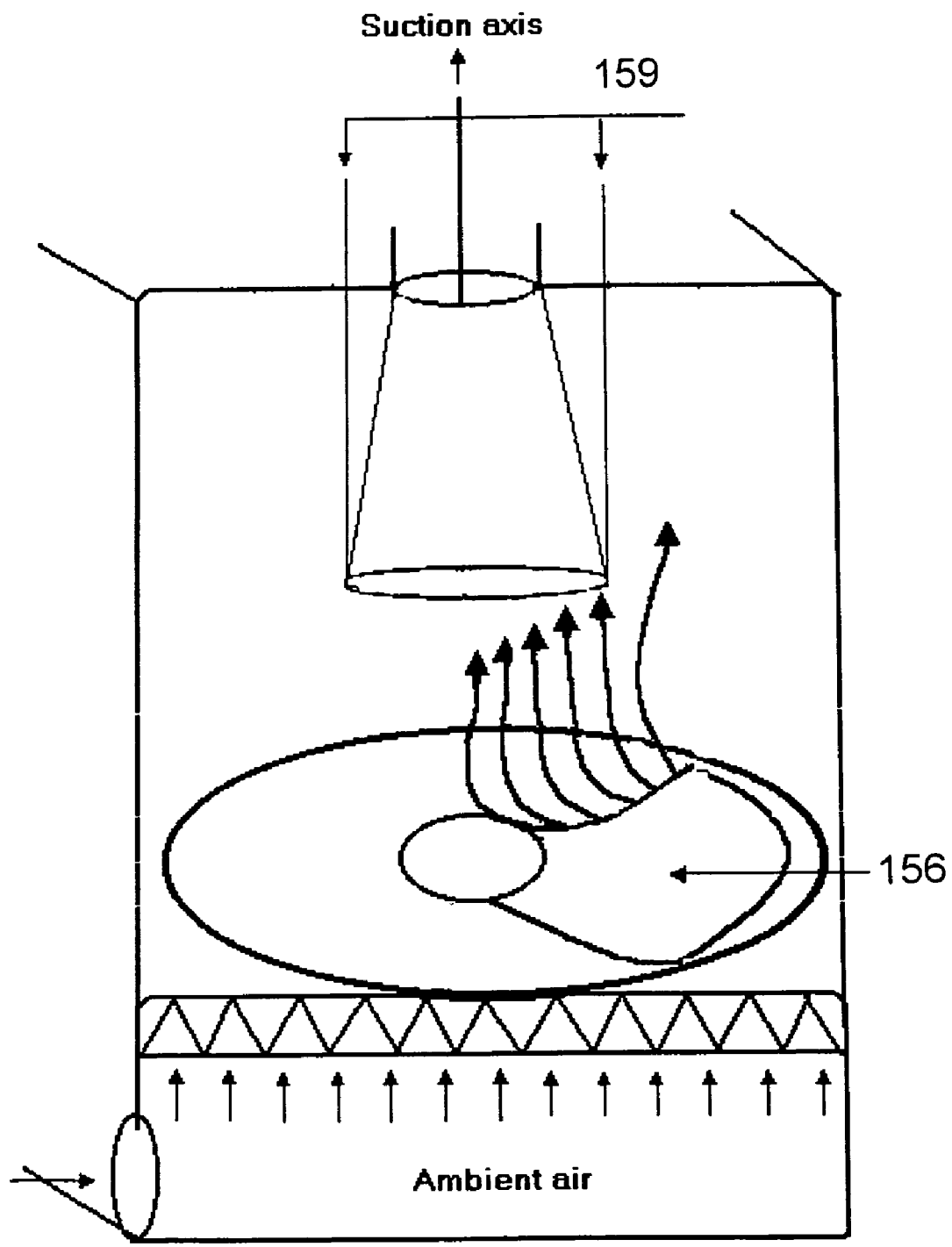
FIG. 13D shows a suction force range at high RPM.

FIG. 13C, shows the conical suction range 158 that is mapped from the air intake port at a lower suction force, e.g., at lower engine rpm. The figure also shows one vane 156 of a spinner and a suitable flow pattern. FIG. 13D shows the conical suction range 159 that is mapped at a higher suction force, i.e. higher engine rpm. As described, the volume enclosed by the boundaries of the suction range is now smaller and the boundaries themselves are closer together than at the lower suction force case. The figure also shows one vane 156 of a spinner and a suitable flow pattern.

Figure 14A:
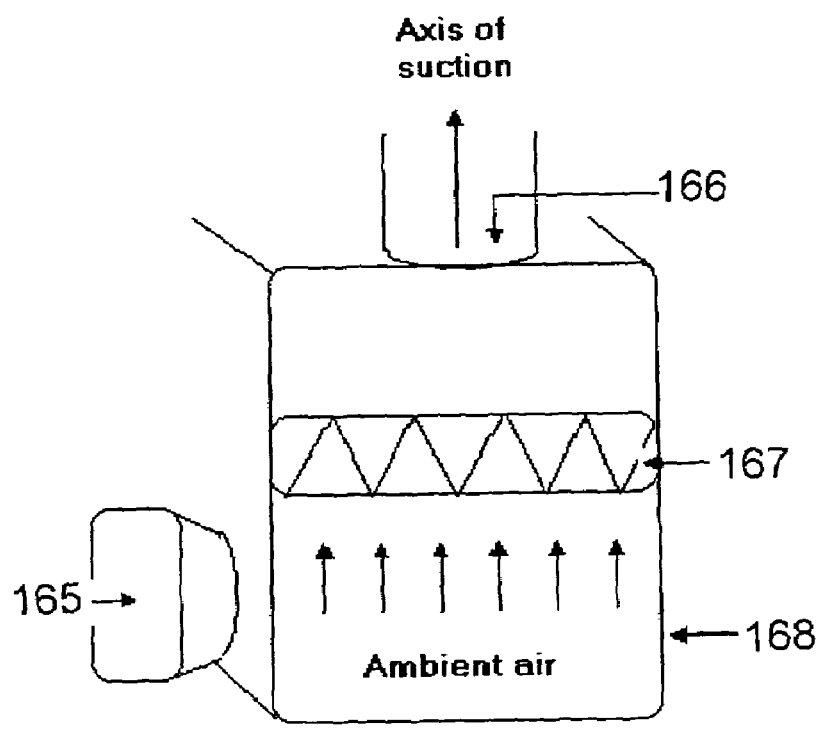
FIG. 14A shows an air box with central intake.
Figure 14B:
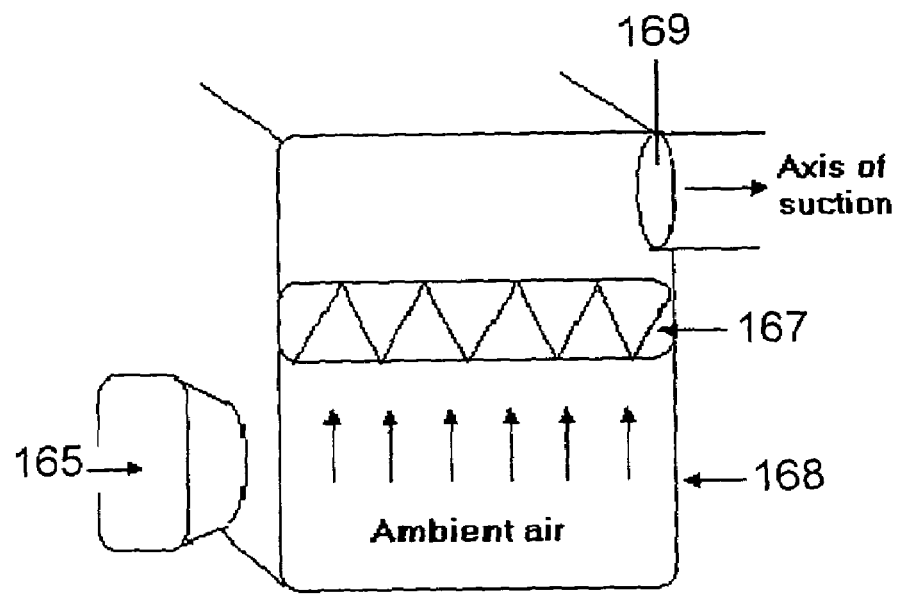
FIG. 14B shows an air box with periphery intake.

FIG. 14A shows an air box 168 with the ambient air intake port 166 in the middle of the air box. FIG. 14B shows an air box which has the intake port 166 at the side of the air box. However, a spinner creating a central oxygen-rich column is used with an air box of the type shown in FIG. 14A and one that creates an oxygen-rich shell is to be used in the case of an air box of the type in FIG. 14B).

Figure 15A:
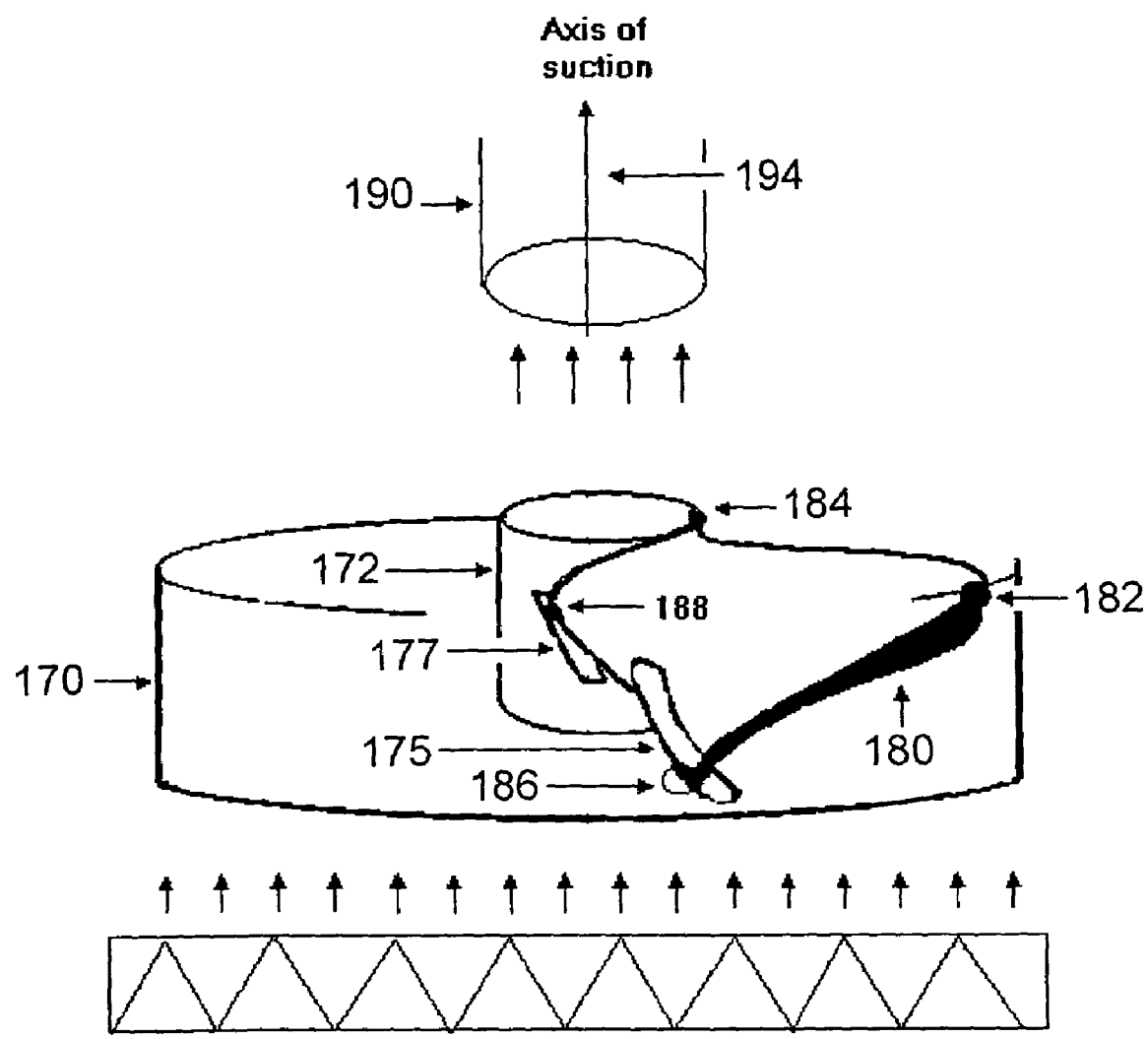
FIG. 15A shows a self-adjusting vane angle.

The spinner could also have a mechanism for self-adjusting the angle of inclination of the fins (FIG. 15A). In such an arrangement, the fins are supported between an outer cylinder 170 and an inner cylinder 172 (only one fin is shown in the figure.) The outer cylinder 170 includes a guide slot 175, and the inner cylinder 172 includes a guide slot 177 the fin 180 is supported by two fixed pivots 182, 184 and by two pins 186, 188 that ride in the guide slots. This enables the fins tp to pivot in order to change their angles of inclination as the pressure changes depending on the suction force of the engine.

At lower engine speeds it is preferable to have a straighter path of air through the spinner, because the suction force is low and a significant portion of the suction force would be required to overcome the drag of the fins. In such a case the angle of inclination, measured from the horizontal, should be large. As the engine speed increases, the suction force increases as does the volume of air flowing past the fins. The angle of inclination would then change so that now it will be of a lower measure when measured from the horizontal. This lower angle of the fins in that circumstance will allow for more efficient oxygen/nitrogen separation and will therefore result in greater overall efficiency.

The shifting of the fin angle can be achieved by a spinner that has the top edges of the fins mounted on pivots 182, 184 and the bottom edges that ride along guides 175, 177. The angle of inclination 178 of the fins will self-adjust with respect to engine suction and will adjust to the most efficient angle required for that suction force from the intake port 190 of the air box and proportionally with the changes in pressure due to changes in suction force of the engine. The suction force will be exerted along the suction axis 194 and the fins will ride up along the guides in proportion with the amount of force applied.

Various methods may be used to maintain the optimal fin angle depending on the suction force applied by the engine. The fins may be designed with the correct weights so that the suction force being applied by the specific engine they are designed for will be sufficient for achieving the correct fin angle. Alternately, the correct fin angle may be obtained by a system of springs attached to the fins. The springs would be chosen of a correct spring constant so that the optimal fin angle can be achieved for the suction pressure being applied by the engine. The fin angles may also be controlled using an active control mechanism, either by a servomechanism or other means. The servomechanism can receive its input from a pressure sensor that measures the current pressure being applied by the engine because of suction.

An additional advantage can be achieved by an arrangement that removes the nitrogen in the outer shell (or inner shell, as the case may be) from the air box, for example, using exhaust suction operating through holes and valves arranged around the wall of the box. By thus increasing the richness of oxygen in the air taken into the intake manifold, engine power will be increased and less emission gases will be produced.

Figure 15B:
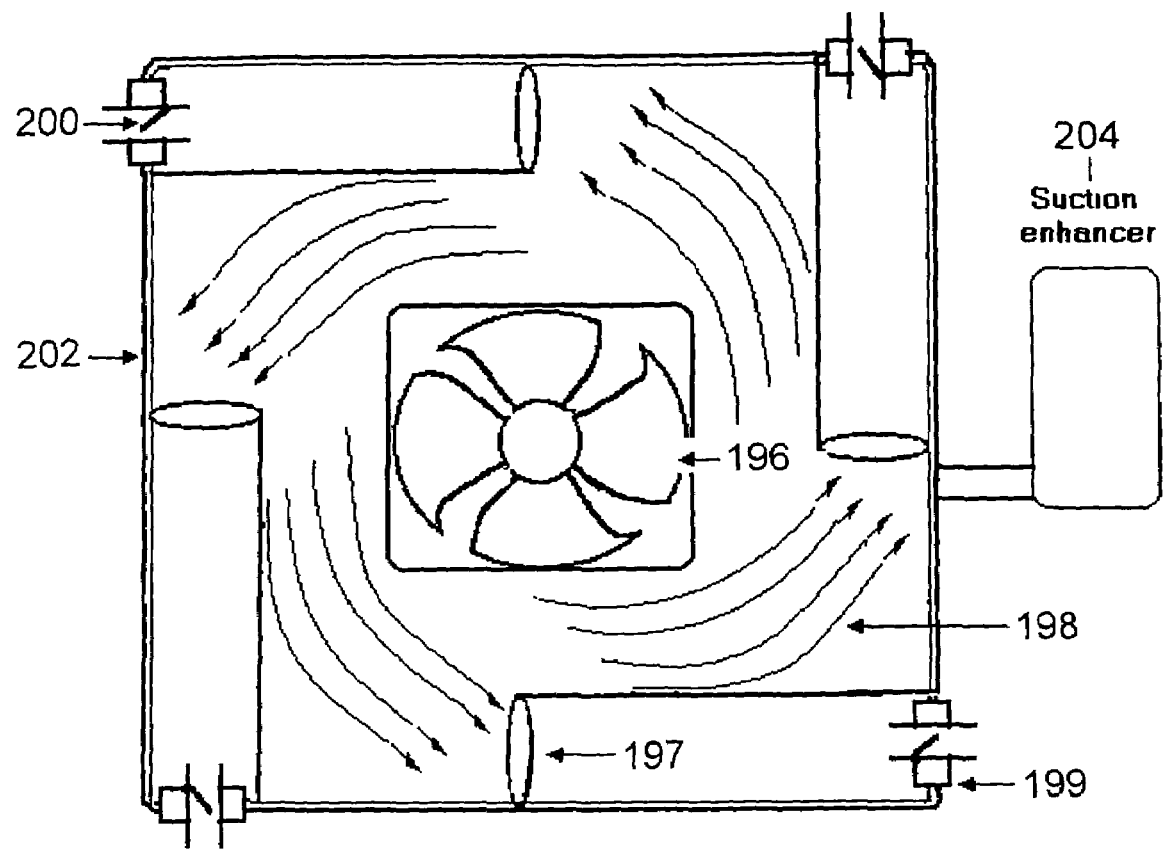
FIG. 15B shows a mechanism to reduce nitrogen.

FIG. 15B shows the top view of an arrangement of a spinner 196 within an air box 292 with exhaust valves 197 to remove the nitrogen-rich air 198 from the box. The figure assumes that the spinner being used produces a oxygen-rich central zone and a nitrogen-rich shell area. The valves in such case are placed around the periphery of the air box. The values 199 used may be of a simple flap type 200, which are activated purely by the pressure differentials within the air box. Alternately, valves which are electrically activated (by solenoids or motors) and timed using a timing mechanism, either within the engine control computer, or a separate controller, may be employed. If the air box requires a spinner that creates a nitrogen-rich central zone and an oxygen-rich shell, then the valves will need to be placed around the central area where the nitrogen-rich air is in abundance. In both cases, the effect on efficiency will be similar. For such an arrangement, an external suction enhancer 204 can be added in order to compensate for the additional volume of air that will be required to be sucked in through the filter, over and above the air volume requirement of the cylinder itself. The enhancer can either be built into the engine itself or added on to the engine or the air box as a peripheral device.

Pressure differentials can be further reduced by placing a mesh at the intake side (the ambient air side) of the filter. The mesh can be of square or other shape, made of nylon or other material and the mesh size should not be of a too large mesh element (or hole) area. Tested meshes have an area of about 0.75 mm square.

Figure 16:
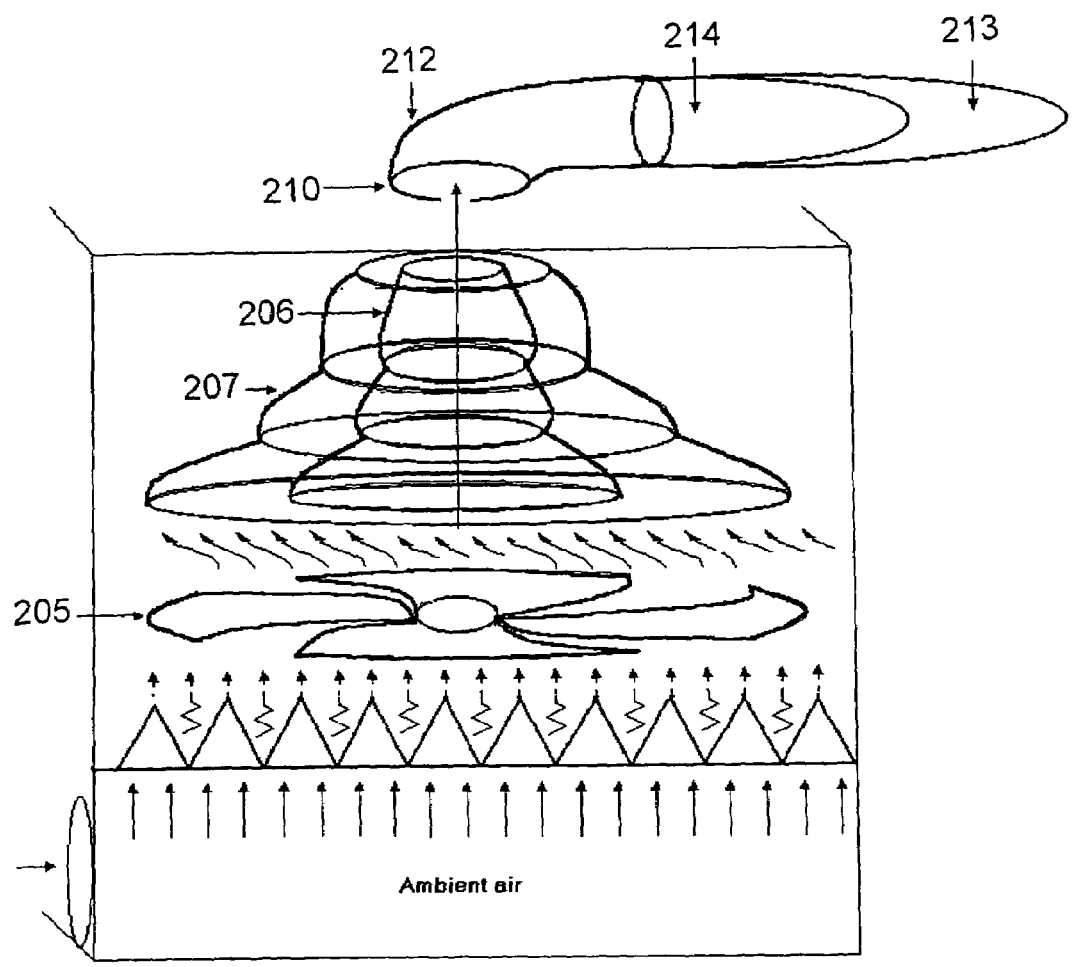
FIG. 16 shows separation of oxygen and nitrogen.

Referring to FIG. 16, assume that a spinner 205 is of the kind that creates a central column of oxygen-rich air 206, the nitrogen is directed toward the outer edges 207 due to the higher velocity imparted to it, and the intake port 210 is placed so that the suction is from the central oxygen-rich area. In this case, the oxygen-rich air 213 will have an advantage (in terms of its position along the induction path) over the nitrogen-rich air 214 and will take the lead during entry into the induction tube 212.

Figure 17A:
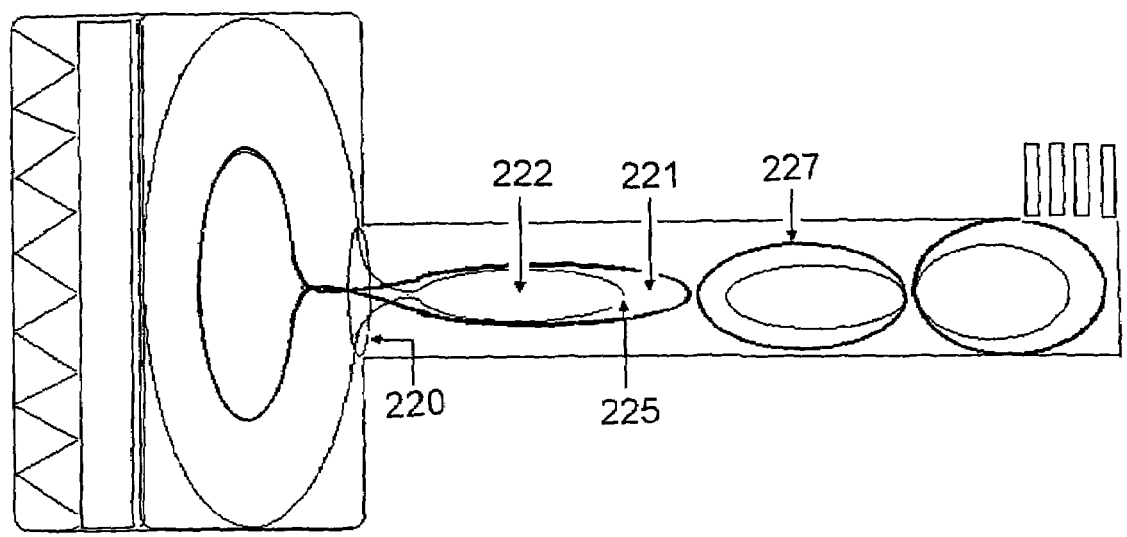
FIG. 17A shows formation of a bubble in the intake tube.

As the engine strokes and the subsequent suction forces are interleaved by dead zones, it is believed that the air profile will be as described below and shown in FIGS. 17A and 17B. During the first suction cycle, oxygen will take the lead 221 into the intake port 220. This will be in the form of an elongated bubble with the oxygen leading. However, because the nitrogen 222 will be accelerated more, it will tend to catch up to the oxygen-rich area. As this happens 225, the oxygen-rich area will begin to envelope the nitrogen area. During the dead zone that occurs between suction cycles, the nitrogen will decelerate faster, while oxygen will continue to travel forward because of its higher mass and therefore, higher momentum. This will make the oxygen once again lead the nitrogen, and will essentially create a form of an elongated bubble 227 where the walls are made of oxygen and the inside is nitrogen.

During the next stroke cycle, the nitrogen inside the bubble will once again try to lead the oxygen walls and will fall back with the following dead zone. Thus, as a result of the alternating suction and non-suction (dead) zones, the nitrogen will oscillate within the bubble. For a 2000 cc 4-cylinder engine, each of these elongated bubbles would have a volume of about 500 cc. With each subsequent stroke, the bubble will move forward along the induction manifold and will essentially maintain the profile of the bubble over its course along the induction manifold.

Figure 17B:
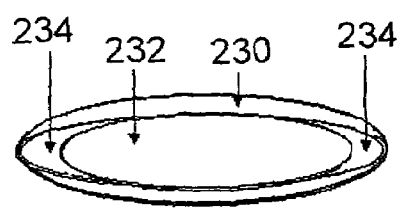
FIG. 17B shows an oscillating range of nitrogen.

FIG. 17B shows one of these bubble formations with the oxygen on the outside walls 230 and the nitrogen in the inner region 232. The oscillatory region 234 where the nitrogen moves forward and back within the bubble is also shown.

Figure 18A:
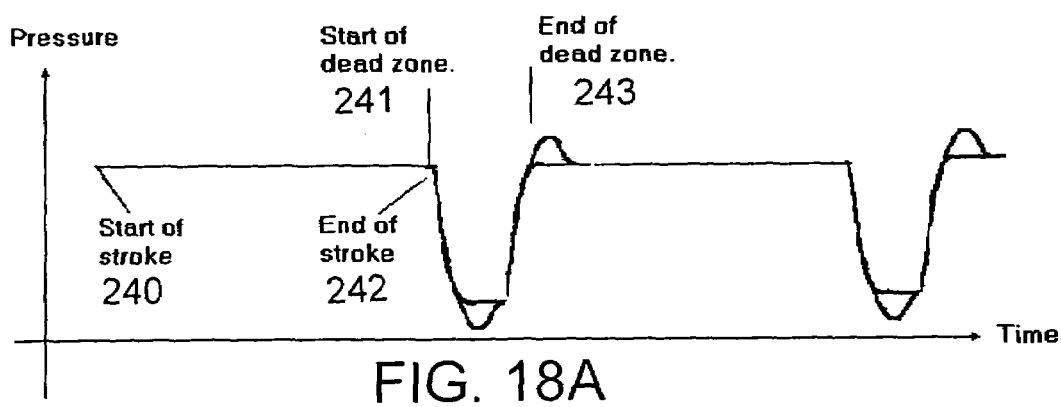
FIG. 18A shows dead zones between strokes with respect to time
Figure 18B:
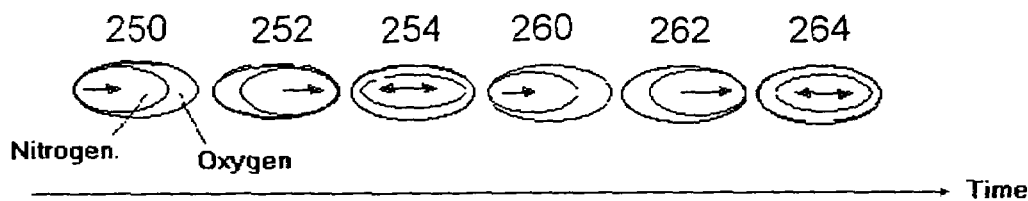
FIG. 18B shows dynamics of a nitrogen bubble between strokes.
Figure 18C:
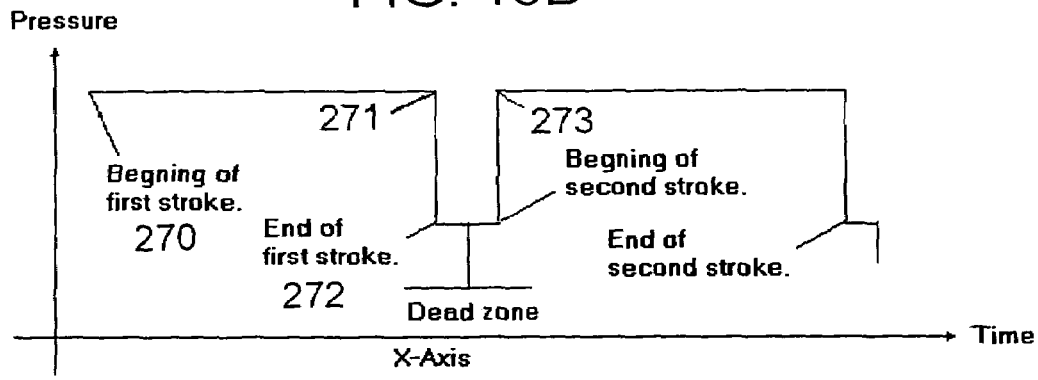
FIG. 18C shows an absolute time representation of dead zones.

FIGS. 18A and 18B are a systematic representation of the formation of these bubbles for two strokes of an engine. The oxygen is sucked in at the start of the stroke 240. At the next dead zone 241, the bubble begins to be completed in the induction tubing. This process is repeated in the second stroke. Reference numbers 250, 252 and 254 show the dynamics of the bubble during the first of these strokes and numbers 260, 262 and 264 show the dynamics during the second stroke.

It is believed that, to achieve maximum efficiency, it may be desirable to keep the volume of the area between the intake port of the air box and the general location of the cylinder atomization points as a multiple of the volume of a single cylinder. Thus for a 2000 cc engine, where each cylinder is 500 cc, the volume of the air path between intake port of the air box and the location of the atomization point intakes should be of the order of either 500 cc or 1000 cc or 1500 cc. If however, the tubing is so long as to be a multiple much greater than 3 or 4, it is possible that the nitrogen will break the bubble and will take the lead over the oxygen-rich area thus negating any gains that might have been achieved in the engine.

It has been experimentally determined that the efficiency of the spinner is highest within a certain temperature range. We believe that this is because the oxygen and nitrogen molecules are in a state of heightened excitation and are easier to separate. Colder air is dense and excitation of molecules is low, therefore making it harder for the separation process. We have observed a respective drop in mileage in very cold weather Mileage falls again at higher temperatures perhaps because the air is rarified and separation efficiency falls again. We have found this range to be about 50 degrees Fahrenheit (10 degrees Celsius) to about 95 degrees F. (35 degrees C.). These temperatures are approximate, and the range may be different. These temperatures are just a reflection of observed results.

A further enhancement would be to add a mechanism to the input side of the air box in order to make sure that the air supplied to the air box lies within the optimal temperature range. The air intake can be controlled by a flap or other mechanism that will mix warm air taken in from a port placed closer to the engine or behind the radiator, with colder ambient air, which will be comparatively cooler, taken in from a port which is placed away from the engine. A thermostat can be used to move the flap so that the mix is maintained within the optimal range. For temperatures outside of the observed range, the efficiency was observed to be not as good as that within the range. This should only happen at the higher end of the range, in very hot weather. In such a case an inter-cooler like mechanism can be employed, which cools the air induced into the air box in order to maintain the temperature within the range. In very cold weather, no external cooling or heating mechanism will be needed, since the heat of the engine itself will be able to provide air that is within the range.

Figure 19:
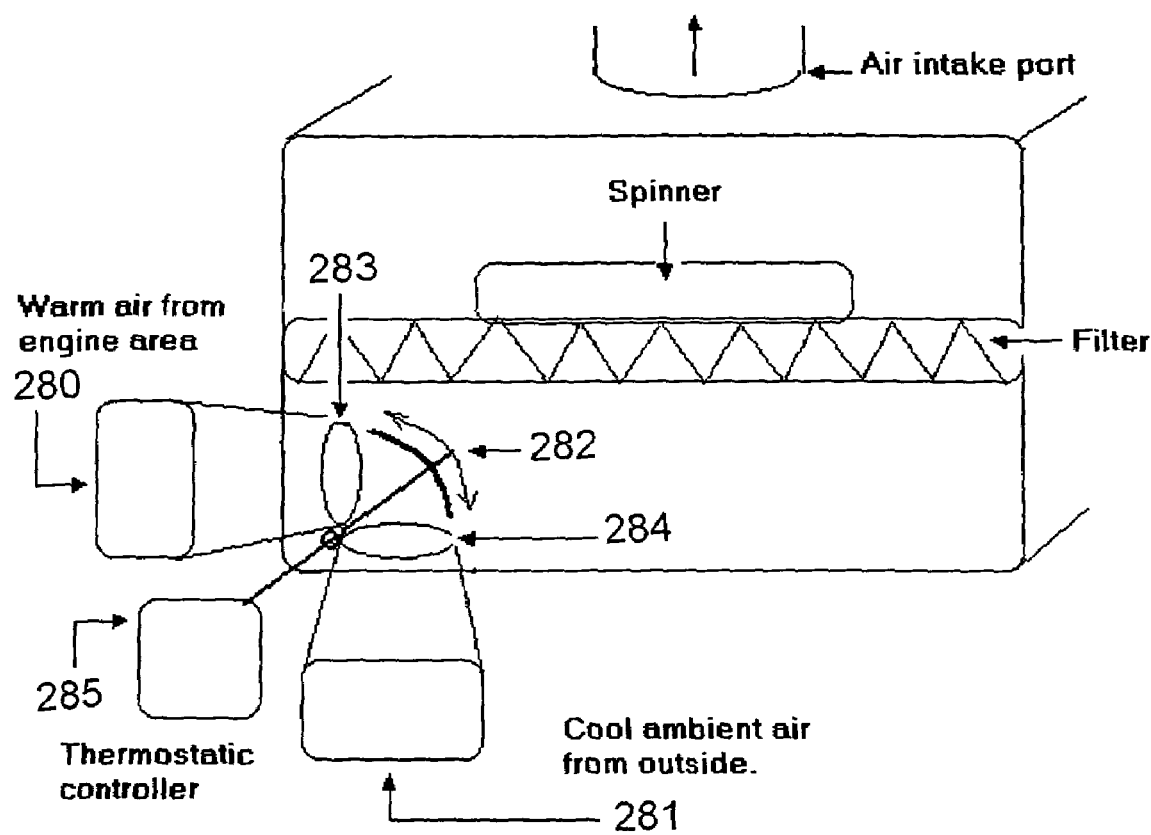
FIG. 19 shows a mechanism to maintain intake air temperature.

FIG. 19 shows an arrangement to mix air and maintain its temperature within a determined optimal range. Warm air is sucked into the air box via a port 280 placed closer to the warm engine or behind the radiator. The ambient, relatively cooler air is sucked in via a port 281 placed so that it takes in ambient air away from the engine area. A flap 282 is placed so that it can move so as to be able to mix the warm and ambient air being sucked into the box. A thermostatic controller 285 controls the position of the flap.

If the air being sucked in is warmer than the higher limit of the determined optimal range, the flap moves so that it covers, either wholly or partially, the inside port 283 through which warm air is piped into the box. As a result, more of the cool air will be allowed into the box keeping the temperature of the mix within the optimal range. If, on the other hand, the mix temperature is colder than the lower limit of the range, the flap moves to cover, either wholly or partially, the inside port 284 through which cool air is piped into the box. As a result more of the warmer air will be allowed in, and the mix will be maintained within the optimal range. This arrangement of the ports, piping, controller and flap may either be built into the air box or as a separate mixing chamber placed before the air box itself.

Figure 20A:
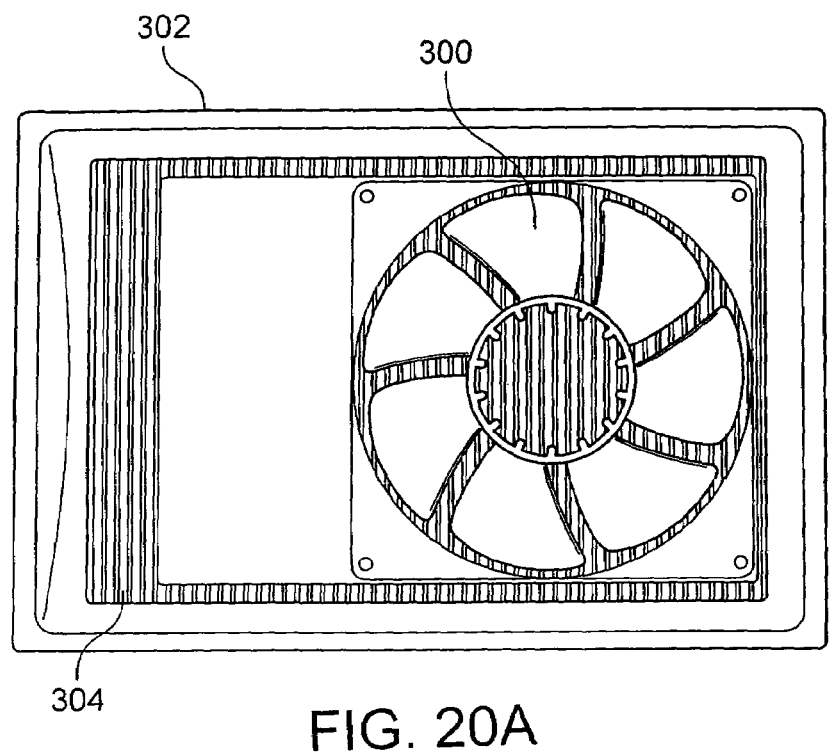
FIG. 20A shows a top view of a spinner concentrating oxygen in center.
Figure 20B:
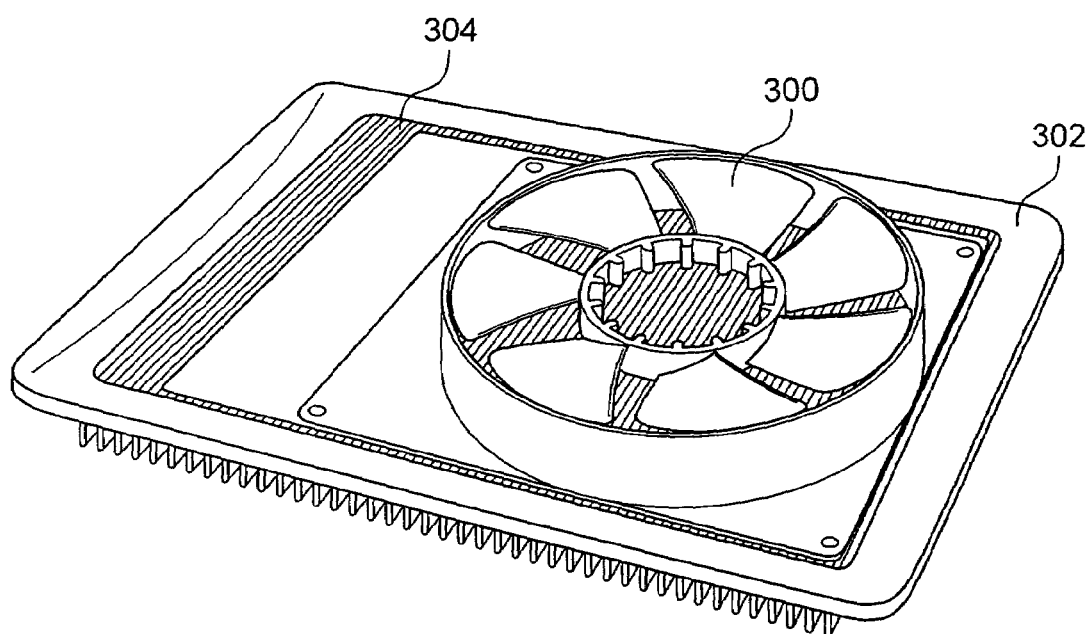
FIG. 20B shows a side view of a spinner concentrating oxygen in center.
Figure 20C:
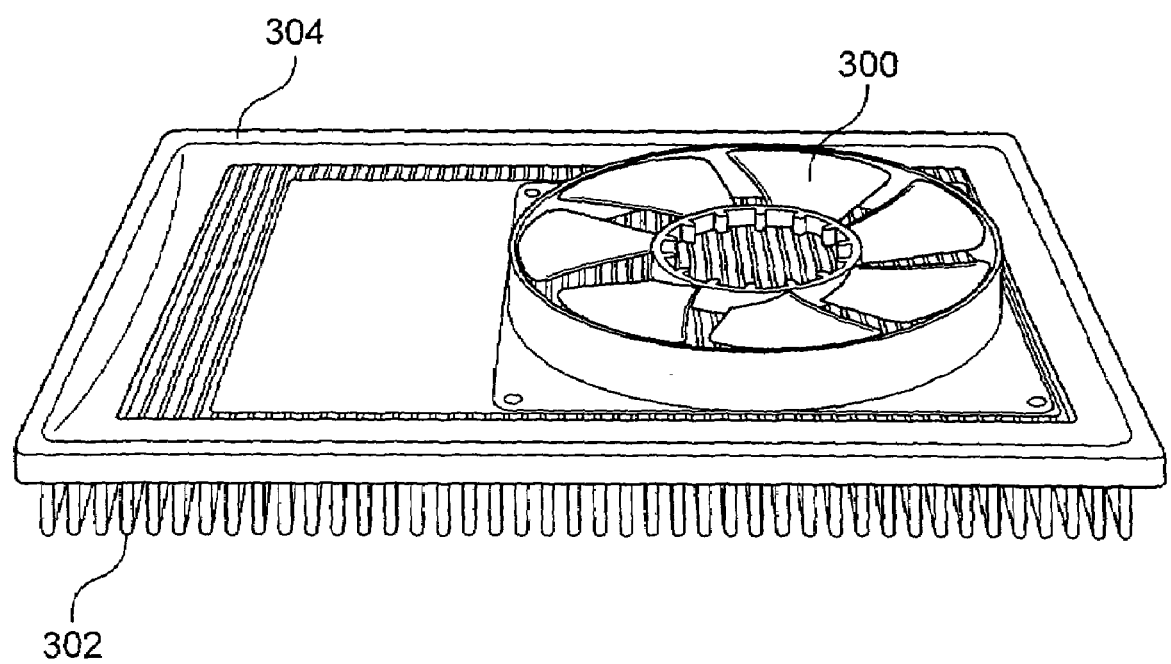
FIG. 20C shows a cross-sectional view of spinner concentrating oxygen in center.

In an example implementation, shown in FIG. 20A, the spinner 300 is mounted directly on a filter frame 302 that contains a pleated filter 304. The pleated filter and filter housing are versions that are typically provided for insertion into the air box of a particular model of automobile. FIGS. 20B and 20C show side and cross views of the same sample unit. The spinner of FIGS. 20A, 20B, and 20C is useful with respect to an air box that has a center port leading to the engine because it produces an oxygen central column and a nitrogen outer shell.

Figure 21A:
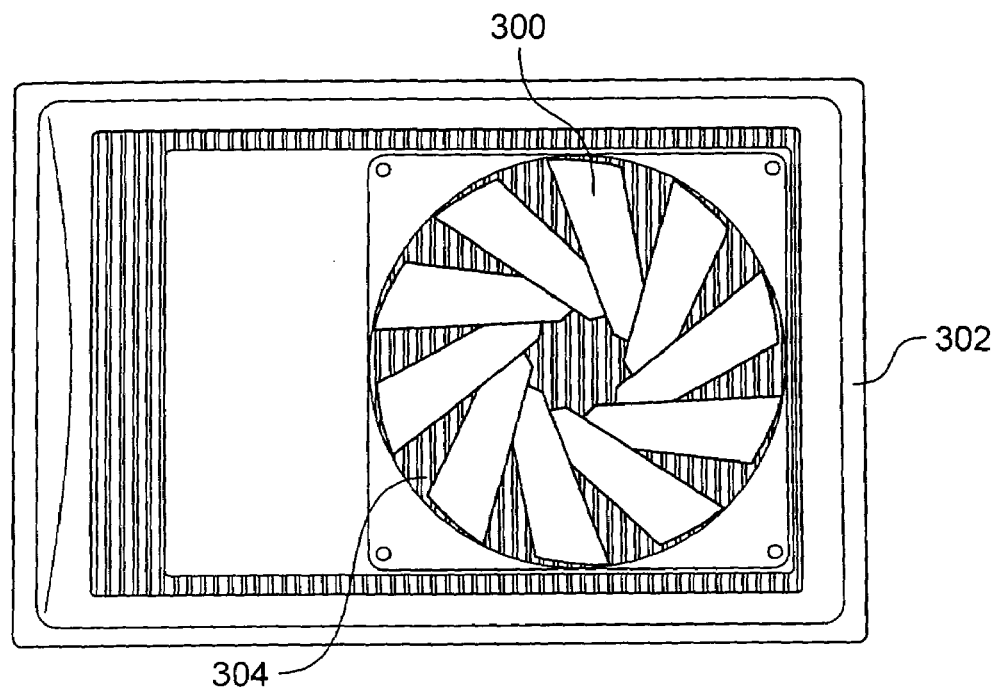
FIG. 21A shows a top view of a spinner concentrating oxygen in periphery.
Figure 21B:
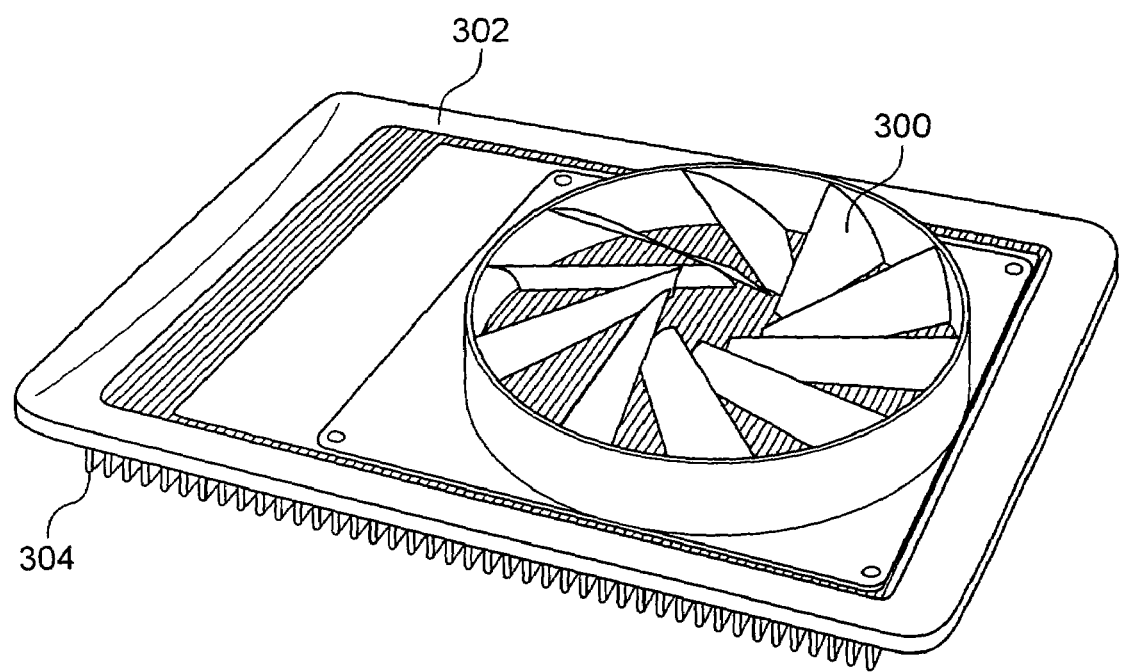
FIG. 21B shows a side view of a spinner concentrating oxygen in periphery
Figure 21C:
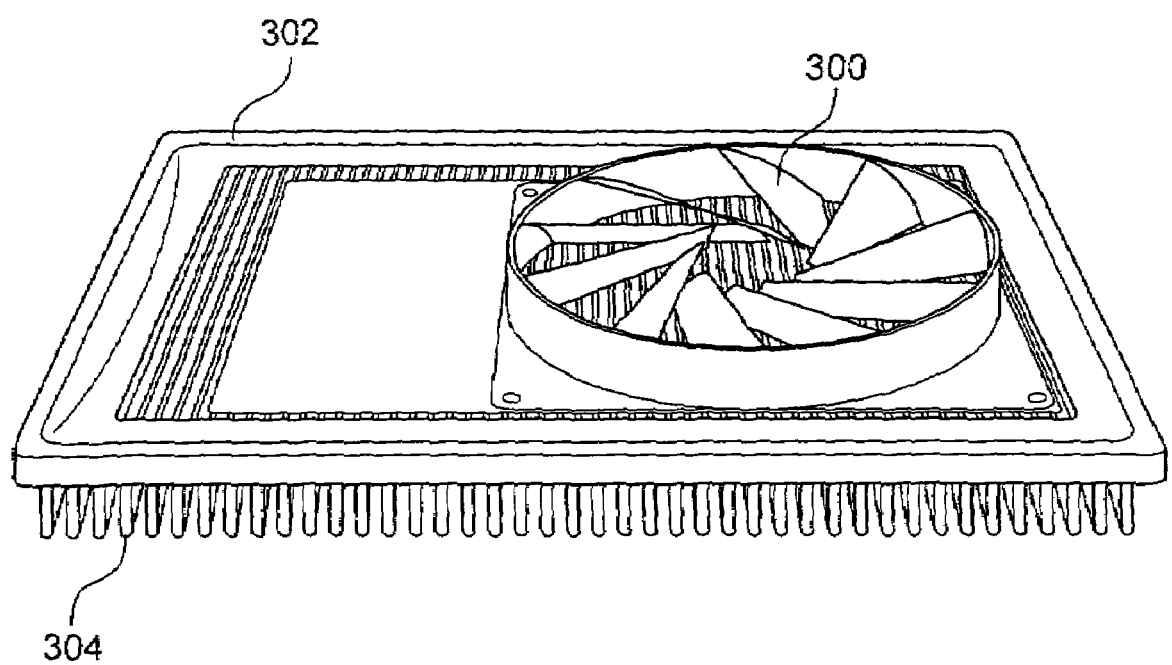
FIG. 21C shows across-sectional view of a spinner concentrating oxygen in periphery.

FIGS. 21A, 21B, and 21C show a spinner that is useful for an air box with a side port, because it produces a central nitrogen column and an outer oxygen shell.

Although the discussion above has postulated certain mechanisms in which the oxygen and nitrogen in the ambient air are reorganized for the purpose of improving the efficiency of the engine. Therefore there may be other reasons for the success of the system that are similar to or different from the ones proposed here.

Other implementations are also within the scope of the following claims.

For example, the spinner could be incorporated permanently into the filter frame so that when the user buys a replacement filter the spinner is included. Or the spinner could be provided as a separate item configured to be added to the filter when it is installed in the air box. In other implementations, the air box could have the spinner incorporated in it so that no modification to the filter frame would be required.

The vanes may not have to be arranged symmetrically in a circle, nor would the surfaces of the vanes have to be planar. Other arrangements of air directing surfaces or other mechanical or electromechanical arrangements, whether or not vanes, could also be provided on the filter, on the filter frame, in the air box, or at other locations and in other configurations provided that they can separate and reconfigure the spatial relationships of the oxygen and nitrogen molecules in the air to provide more oxygen at the point and time of atomization.

The techniques described above are applicable to other kinds of equipment that use oxygen contained in air, such as a diesel engine, a furnace, either for home heating or for other purposes such as turbine steam generator furnaces.

Figure 22:
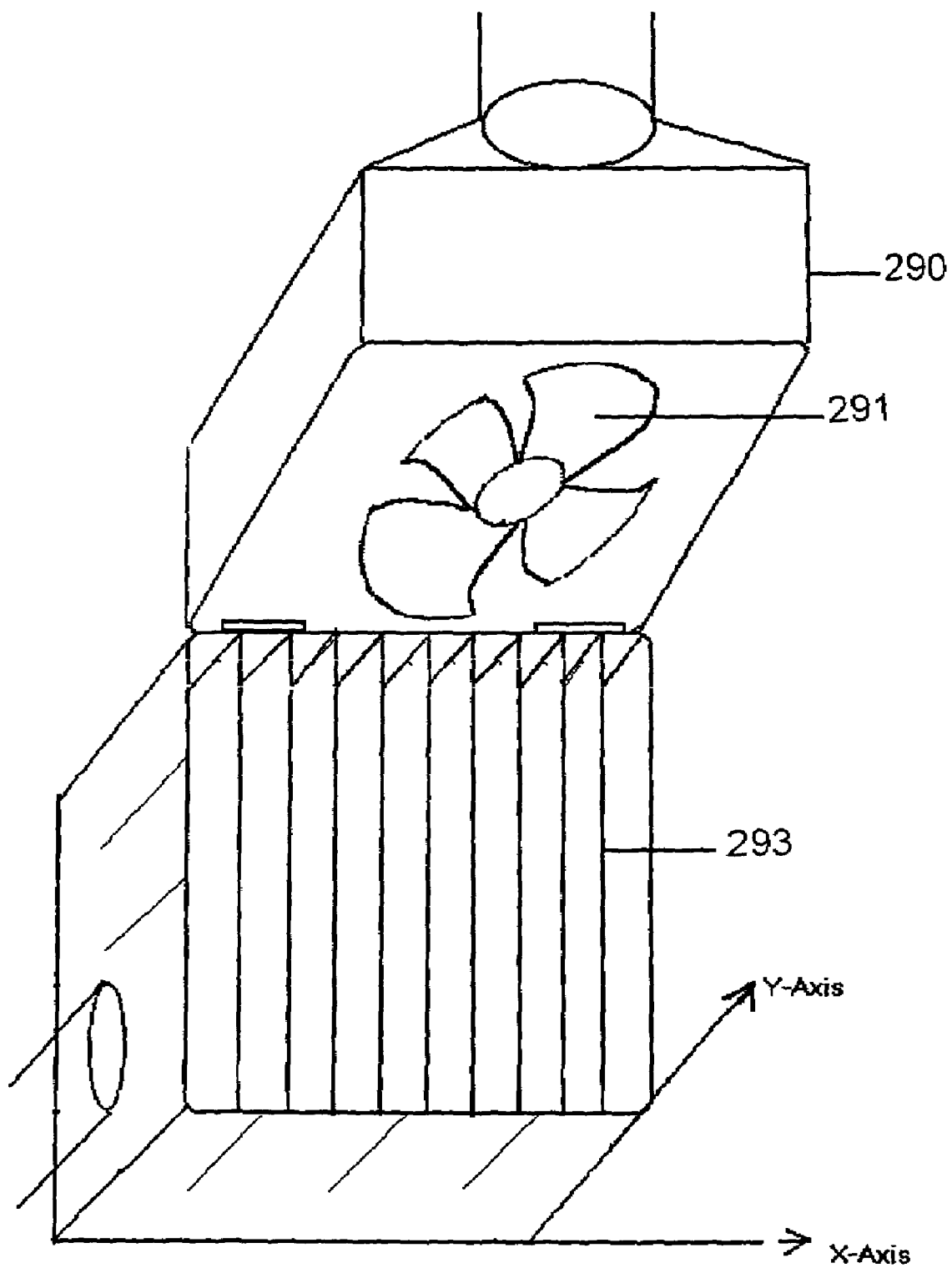
FIG. 22 shows a spinner part of the filter box assembly.

For example, as shown in FIG. 22, an air box cover 290 may have a spinner unit 291 built into it. One advantage of this arrangement will be that, when the cover is closed over the air box 292 with the filter 293 inserted into it, the optimal placement of the spinner unit will automatically be achieved. A filter built to the proper parameters may be required to achieve good separation taking into account the parameters that have been explained earlier. This will achieve proper placement along all three axes, x, and z as well as y which is the height at which the spinner needs to be placed above the filter surface. This will also avoid any skew in the placement along all three Cartesian planes.

The invention claimed is:

1. Apparatus comprising
a mechanism configured to receive air which has been sucked through a device that imparts turbulence to the air, the mechanism being structured to establish regions of enhanced oxygen density in the air at locations downstream of the mechanism,
the mechanism being separated from the device by a gap of between 1 and 10 mm.

2. The apparatus of claim 1 in which the mechanism is configured to impart centrifugal force to the air.

3. The apparatus of claim 1 in which the mechanism comprises deflection surfaces.

4. The apparatus of claim 1 in which the mechanism comprises a set of deflection surfaces arranged in a suction path along which the air is being sucked.

5. The apparatus of claim 1 in which the device that imparts turbulence comprises an air filter.

6. The apparatus of claim 1 in which the mechanism is also configured to be mounted within an air box having an air inlet served by the device that imparts turbulence.

7. The apparatus of claim 1 in which the mechanism comprises a set of vanes configured to spin the air that has been sucked through the device that imparts turbulence.

8. The apparatus of claim 1 also including the device through which the air is being sucked.

9. The apparatus of claim 8 in which the device comprises an air filter.

10. The apparatus of claim 9 in which the air filter and the mechanism are connected with a in a single unit.

11. The apparatus of claim 9 in which the air filter comprises a vehicular air filter and the mechanism comprises an air spinner.

12. The apparatus of claim 1 in which the mechanism is located adjacent to a region where an intensity of intermolecular collisions is high.

13. The apparatus of claim 1 in which the mechanism is also structured to establish regions of enhanced nitrogen density.

14. The apparatus of claim 1 in which the enhanced oxygen density is available when the air arrives at a location where oxygen is to be consumed.

15. The apparatus of claim 7 in which each of the vanes is arranged at an angle to a path along which the air is being sucked.

16. The apparatus of claim 7 in which the vanes are arranged around a central point to form a spinner.

17. The apparatus of claim 7 in which at least some of the vanes are mounted so that an angle formed between the vanes and a path along which the air is being sucked varies with suction.

18. The apparatus of claim 7 in which the vanes comprise airfoils.

19. The apparatus of claim 7 in which the vanes are configured to cause components of the air having higher masses to move radially away from a path along which the air is being sucked.

20. The apparatus of claim 7 in which the vanes are configured to cause components of the air having lower masses to move radially toward a path along which the air is being sucked.

21. The apparatus of claim 7 in which the vanes are configured to cause components of the air having lower masses to move radially away from a path along which the air is being sucked.

22. The apparatus of claim 7 in which the vanes are configured to cause components of the air having higher masses to move radially toward a path along which the air is being sucked.

23. Apparatus comprising
a mechanism configured to receive air which has been sucked through a device that imparts turbulence to the air, the mechanism being structured to establish regions of enhanced oxygen density in the air at locations downstream of the mechanism,
the device being spaced apart from the mechanism by a gap between them that fluctuates with an amount of suction.

24. The apparatus of claim 23 in which the device and the mechanism is connected to the device using a flexible skirt.

25. The apparatus of claim 23 or 24 in which the device comprises an air filter.

26. Apparatus comprising
a mechanism configured to receive air which has been sucked through a device that imparts turbulence to the air, the mechanism being structured to establish regions of enhanced oxygen density in the air at locations downstream of the mechanism,
in which the mechanism has an axis and an outlet of an air box associated with the mechanism is not aligned with the axis.

27. The apparatus of claim 26 also including the air box.

28. The apparatus of claim 27 in which the mechanism is supported within the air box.

29. The apparatus of claim 27 in which the mechanism is supported at a predetermined distance from an outlet of the air box.

30. The apparatus of claim 26 in which the mechanism is also structured so that the regions of enhanced oxygen density reach the outlet before regions of enhanced nitrogen density.

31. The apparatus of claim 27 in which the air box includes a structure configured to select air to be drawn into the air box based on the temperature of the air.

32. The apparatus of claim 31 in which hot and cold air are mixed to maintain an effective temperature range in the air box.

33. Apparatus comprising
a mechanism configured to receive air which has been sucked through a device that imparts turbulence to the air, the mechanism being structured to establish regions of enhanced oxygen density in the air at locations downstream of the mechanism, and
an air box including exhaust openings to remove at least some components of the air other than oxygen.

34. The apparatus of claim 33 in which the exhaust openings include pressure-operated valves.

35. The apparatus of claim 33 in which the exhaust openings include pressure-operated valves and a suction enhancement device.

36. Apparatus comprising
a mechanism structured to receive air which has been sucked through a device that imparts turbulence to the air, and to reduce a stage of low-amplitude, high-frequency turbulence imparted to the air as it is being sucked through the device,
the device being connected to the mechanism so that a gap between them fluctuates with suction.

37. The apparatus of claim 36 in which the mechanism comprises deflection surfaces.

38. The apparatus of claim 36 in which the mechanism is also configured to be mounted within an air box having an air inlet served by the device that imparts turbulence.

39. The apparatus of claim 36 also including the device through which the air is being sucked, the device comprising an air filter.

40. The apparatus of claim 38 in which the mechanism comprises a set of vanes configured to spin the air that has been sucked through the device.

41. The apparatus of claim 40 in which the vanes are arranged around a central point to form a spinner.

42. The apparatus of claim 40 in which at least some of the vanes are mounted so that an angle formed between the vanes and a path along which the air is being sucked varies with suction.

43. The apparatus of claim 36 also including an air box.

44. The apparatus of claim 43 in which the air box includes a structure configured to select air to be drawn into the air box based on the temperature of the air.

45. The apparatus of claim 44 in which hot and cold air are mixed to maintain an effective temperature range in the air box.

46. Apparatus comprising
a mechanism structured to receive air which has been sucked through a device that imparts turbulence to the air, and to reduce effects that are due to bands of turbulence produced in the air by stroking of an internal combustion engine,
the mechanism being spaced apart from the device by a gap between them that fluctuates with suction.

47. The apparatus of claim 46 in which the effects that are due to bands of turbulence produced in the air by stroking of an internal combustion engine comprise oxygen molecules becoming surrounded by nitrogen molecules.

48. The apparatus of claim 46 in which the effects that are due to bands of turbulence produced in the air by stroking of an internal combustion engine comprise the reduction in efficiency of a combustion reaction in which the air is a reactant.

49. The apparatus of claim 46 in which the mechanism comprises deflection surfaces.

50. The apparatus of claim 46 in which the mechanism is also configured to be mounted within an air box having an air inlet served by the device that imparts turbulence.

51. The apparatus of claim 46 also including the device through which the air is being sucked, the device comprising an air filter.

52. The apparatus of claim 50 in which the mechanism comprises a set of vanes configured to spin the air that has been sucked through the device.

53. The apparatus of claim 52 in which the vanes are arranged around a central point to form a spinner.

54. The apparatus of claim 50 in which at least some of the vanes are mounted so that an angle formed between the vanes and a path along which the air is being sucked varies with suction.

55. The apparatus of claim 46 also including an air box.

56. The apparatus of claim 55 in which the air box includes a structure configured to select air to be drawn into the air box based on the temperature of the air.

57. Apparatus comprising
a mechanism structured to receive air which has been sucked through a device that imparts turbulence to the air, and to reduce effects that are due to phase shifts within bands of turbulence produced in the air by stroking of an internal combustion engine,
the mechanism being spaced apart from the device by a gap between them that fluctuates with suction.

58. The apparatus of claim 57 in which the effects that are due to phase shifts within bands of turbulence produced in the air by stroking of an internal combustion engine include oxygen molecules becoming surrounded by nitrogen molecules.

59. The apparatus of claim 57 in which the effects that are due to phase shifts within bands of turbulence produced in the air by stroking of an internal combustion engine include a reduction in efficiency of a combustion reaction in which the air is a reactant.

60. The apparatus of claim 57 in which the mechanism comprises deflection surfaces.

61. The apparatus of claim 57 in which the mechanism is also configured to be mounted within an air box having an air inlet served by the device that imparts turbulence.

62. The apparatus of claim 61 in which the mechanism comprises a set of vanes configured to spin the air that has been sucked through the device.

63. The apparatus of claim 62 in which the vanes are arranged around a central point to form a spinner.

64. The apparatus of claim 62 in which at least some of the vanes are mounted so that an angle formed between the vanes and a path along which the air is being sucked varies with suction.

65. The apparatus of claim 57 also including an air box.

66. The apparatus of claim 65 in which the air box includes a structure configured to select air to be drawn into the air box based on the temperature of the air.

67. The apparatus of claim 57 also including the device through which the air is being sucked, where the device is an air filter.

68. Apparatus comprising
a mechanism configured to receive air which has been sucked through a device that imparts turbulence to the air,
the mechanism being structured to establish regions of enhanced oxygen density in the air at locations downstream of the mechanism
the mechanism also being structured so that the regions of enhanced oxygen density reach an outlet of an air box before regions of enhanced nitrogen density, and the lead or lag of oxygen over nitrogen is adjustable by adjusting the mechanism relative to the outlet of the air box.

69. Apparatus comprising
a mechanism configured to receive air which has been sucked through a device that imparts turbulence to the air,
the mechanism being structured to establish regions of enhanced oxygen density in the air at locations downstream of the mechanism, and
an air box including exhaust openings to remove at least some components of the air other than oxygen,
in which the exhaust openings regulate air pressure on the upstream and downstream sides of an air filter.

70. Apparatus comprising
a mechanism configured to receive air which has been sucked through a device that imparts turbulence to the air, the mechanism being structured to establish regions of enhanced oxygen density in the air at locations downstream of the mechanism,
the mechanism being separated from the device by a gap of between 1 and 5 mm.

71. Apparatus comprising
a mechanism configured to receive air which has been sucked through a device that imparts turbulence to the air, the mechanism being structured to establish regions of enhanced oxygen density in the air at locations downstream of the mechanism,
the mechanism being separated from the device by a gap of less than 5 mm.

* * * * *